United States Patent
Brown et al.

(10) Patent No.: US 7,743,189 B2
(45) Date of Patent: Jun. 22, 2010

(54) PCI FUNCTION SOUTH-SIDE DATA MANAGEMENT

(75) Inventors: Aaron C. Brown, Austin, TX (US);
Douglas M. Freimuth, New York, NY (US); Renato J. Recio, Austin, TX (US);
Steven M. Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 12/114,961

(22) Filed: May 5, 2008

(65) Prior Publication Data

US 2009/0276775 A1    Nov. 5, 2009

(51) Int. Cl.
| G06F 13/00 | (2006.01) |
| G06F 13/20 | (2006.01) |
| G06F 9/455 | (2006.01) |
| G06F 13/10 | (2006.01) |
| G06F 9/46 | (2006.01) |
| G06F 13/14 | (2006.01) |

(52) U.S. Cl. ............................. 710/104; 710/313; 718/1
(58) Field of Classification Search ................. 710/313, 710/104
See application file for complete search history.

(56) References Cited

U.S. PATENT DOCUMENTS

| 6,823,418 B2* | 11/2004 | Langendorf et al. ......... 710/306 |
| 7,234,050 B2* | 6/2007 | Agan et al. ..................... 713/1 |
| 7,376,782 B2* | 5/2008 | Balraj et al. ................... 711/2 |
| 7,529,860 B2* | 5/2009 | Freimuth et al. .............. 710/8 |
| 2003/0005207 A1* | 1/2003 | Langendorf et al. ......... 710/306 |
| 2005/0055484 A1* | 3/2005 | Iskiyan et al. ................ 710/104 |
| 2006/0179210 A1* | 8/2006 | Saha ........................... 711/103 |
| 2007/0005869 A1* | 1/2007 | Balraj et al. ................... 711/2 |
| 2007/0186025 A1* | 8/2007 | Boyd et al. ................... 710/305 |
| 2007/0192582 A1* | 8/2007 | Agan et al. .................... 713/2 |
| 2008/0005297 A1* | 1/2008 | Kjos et al. .................... 709/223 |
| 2008/0022018 A1* | 1/2008 | Konno et al. ................... 710/11 |
| 2008/0104378 A1* | 5/2008 | Huang et al. ................... 713/1 |
| 2008/0222338 A1* | 9/2008 | Balasubramanian et al. 710/306 |
| 2009/0248947 A1* | 10/2009 | Malwankar et al. ......... 710/316 |

OTHER PUBLICATIONS

PCI-SIG; "Single Root I/O Virtualization and Sharing Specification"; PCI-SIG; Revision 1.0; Sep. 11, 2007; all pages.*

* cited by examiner

*Primary Examiner*—Ryan M Stiglic
(74) *Attorney, Agent, or Firm*—Stephen J. Walder, Jr.; Matthew B. Talpis

(57) ABSTRACT

A hypervisor, during device discovery, has code which can examine the south-side management data structure in an adapter's configuration space and determine the type of device which is being configured. The hypervisor may copy the south-side management data structure to a hardware management console (HMC) and the HMC can populate the data structure with south-side data and then pass the structure to the hypervisor to replace the data structure on the adapter. In another embodiment the hypervisor may copy the data structure to the HMC and the HMC can instruct the hypervisor to fill-in the data structure, a virtual function at a time, with south-side management data associations. The administrator can assign south-side data, such as a MAC address for a virtual instance of an Ethernet device, to LPARs sharing the adapter. Thus, a standard way to manage the south-side data of virtual functions is provided.

20 Claims, 15 Drawing Sheets

FIG. 11C

| 1160 | 1170 | 1172 | 1174 | 1176 |
|---|---|---|---|---|
| TYPE | DEVICE | DEVICE SSS | EXTERNAL SOUTH SIDE STATE | system id.root complex id.RID |
| 0000 0000x READ ONLY | PCIe FC READ/WRITE | WWPN (READ ONLY IF PRESET BEFORE BRINGUP) | LOGICAL AND PHYSICAL LUNs – THAT IS, WHAT DEVICES ARE ASSOCIATED WITH THE WWPN READ/WRITE | USED TO UNIQUELY IDENTIFY VIRTUAL FUNCTION READ/WRITE |
| 0000 0001x READ ONLY | PCIe LAYER-2 ENET | MAC@ (READ ONLY IF PRESET BEFORE BRINGUP) | POSSIBLY THE IP@ ASSOCIATED WITH THE MAC@, THOUGH THESE DAYS THAT WILL BE OBTAINED BY OS THROUGH DHCP READ/WRITE | ... |
| 0000 0002x READ ONLY | PCIe SAS | TABLE OF LUN MASKS/MAPS (READ ONLY IF PRESET BEFORE BRINGUP) | PHYSICAL LUNs – GIVEN THE LUN MASK/MAP RESIDES ON THE PCIe DEVICE, THE LIST WOULD INCLUDE THE PHYSICAL DEVICES ASSOCIATED WITH THE ADAPTER. READ/WRITE | ... |
| ... | | | ... | ... |

ABOVE TABLE SHOWS THREE PHYSICALLY DIFFERENT PCIe DEVICES

PCIe DEVICE RELATED SOUTH SIDE STATE THAT IS MAINTAINED IN THE HMC DATABASE AND CONVEYED TO THE ADAPTER

SOUTH SIDE STATE THAT IS RELATED TO THE EXTERNAL INTERFACE WHICH THE PCIe DEVICE CONNECTS TO. THIS STATE IS ALSO MAINTAINED IN THE HMC DATABASE

FIG. 11D

| TYPE 1160 | DEVICE 1170 | DEVICE SSS 1172 | EXTERNAL SOUTH SIDE STATE 1174 | system id.root complex id.RID 1176 |
|---|---|---|---|---|
| 0000 0000x | PCIe FC | 300d700400000000 | LOGICAL AND PHYSICAL LUNs – THAT IS, WHAT DEVICES ARE ASSOCIATED WITH THE WWPN | 26.32.8432 |
| 0000 0001x | PCIe LAYER-2 ENET | 20-42-88-14-b3-9a | 10.14.19.7 | 25.44.7532 |
| 0000 0002x | PCIe SAS | TABLE OF LUN MASKS/MAPS | PHYSICAL LUNs – GIVEN THE LUN MASK/MAP RESIDES ON THE PCIe DEVICE, THE LIST WOULD INCLUDE THE PHYSICAL DEVICES ASSOCIATED WITH THE ADAPTER | 26.32.8335 |
| ... | ... | ... | ... | ... |

ABOVE TABLE SHOWS THREE PHYSICALLY DIFFERENT PCIe DEVICES

PCIe DEVICE RELATED SOUTH SIDE STATE THAT IS MAINTAINED IN THE HMC DATABASE AND CONVEYED TO THE ADAPTER

SOUTH SIDE STATE THAT IS RELATED TO THE EXTERNAL INTERFACE WHICH THE PCIe DEVICE CONNECTS TO. THIS STATE IS ALSO MAINTAINED IN THE HMC DATABASE

PCI FUNCTION SOUTH-SIDE DATA MANAGEMENT

BACKGROUND OF THE INVENTION

1. Field of the Invention

The present invention relates generally to an improved data processing system and method. More specifically, the present invention is directed to a system and method for the management of device specific virtual function (VF) data (for example, the network addresses for the VFs) on an input/output virtualization (IOV) enabled adapter, such as a Peripheral Component Interconnect (PCI) IOV adapter. Even more specifically, the management of this device specific data may be referred to as the adapter "south-side management," since this data is used to operate on the device below the PCI hierarchy.

2. Background of the Invention

Most modern computing devices make use of input/output (I/O) adapters and buses that utilize some version or implementation of the Peripheral Component Interconnect standard, which was originally created by Intel in the 1990s. The Peripheral Component Interconnect (PCI) standard specifies a computer bus for attaching peripheral devices to a computer motherboard. PCI Express, or PCIe, is an implementation of the PCI computer bus that uses existing PCI programming concepts, but bases the computer bus on a completely different and much faster serial physical-layer communications protocol. The physical layer consists, not of a bi-directional bus which can be shared among a plurality of devices, but of single uni-directional links, which are connected to exactly two devices.

FIG. 1 is an exemplary diagram illustrating a system incorporating a PCI Express (PCIe) fabric topology in accordance with the PCIe specification. As shown in FIG. 1, the system 100 is comprised of a host processor (CPU) 110 and memory 120 coupled to a root complex 130, which is in turn coupled to one or more of a PCIe endpoint 140 (the term "endpoint" is used in the PCIe specification to refer to PCIe enabled I/O adapters), a PCI express to PCI bridge 150, and one or more interconnect switches 160. The root complex 130 denotes the root of an I/O hierarchy that connects the CPU/memory to the I/O adapters. The root complex 130 includes a host bridge, zero or more root complex integrated endpoints, zero or more root complex event collectors, and one or more root ports. Each root port supports a separate I/O hierarchy. The I/O hierarchies may be comprised of a root complex 130, zero or more interconnect switches 160 and/or bridges 150 (which comprise a switch or PCIe fabric), and one or more endpoints, such as endpoints 140, 170 and 182-188. For more information regarding PCI and PCIe, reference is made to the PCI and PCIe specifications available from the peripheral component interconnect special interest group (PCI-SIG) website at www.pcisig.com.

In addition to the PCI and PCIe specifications, the PCI-SIG has also defined input/output virtualization (IOV) standards for defining how to design an I/O adapter (IOA) which can be shared by several logical partitions (LPARs). A LPAR is a division of a computer's processors, memory, and storage into multiple sets of resources so that each set of resources can be operated independently with its own operating system instance and applications. The number of logical partitions that can be created depends on the system's processor model and resources available. Typically, partitions are used for different purposes such as database operation, client/server operation, to separate test and production environments, or the like. Each partition can communicate with the other partitions as if the other partition is in a separate machine. In modern systems that support LPARs, some resources may be shared amongst the LPARs. As mentioned above, in the PCI and PCIe specification, one such resource that may be shared is the I/O adapter using I/O virtualization mechanisms.

BRIEF SUMMARY OF THE INVENTION

In one illustrative embodiment, a method, in a data processing system, for managing functions of an adapter associated with the data processing system is provided. The method may comprise receiving a command to modify south-side management data in a south-side management data array associated with the adapter. The method may further comprise retrieving the south-side management data array associated with the adapter from the adapter and modifying at least a portion of the south-side management data in the south-side management data array on the adapter based on the received command. The method may also comprise managing the functions of the adapter based on the south-side management data in the south-side management data array.

In another illustrative embodiment, a computer program product comprising a computer useable medium having a computer readable program is provided. The computer readable program, when executed on a computing device, causes the computing device to receive a command to modify south-side management data in a south-side management data array associated with an adapter coupled to the computing device. The computer readable program further causes the computing device to retrieve the south-side management data array associated with the adapter from the adapter and modify at least a portion of the south-side management data in the south-side management data array on the adapter based on the received command. Moreover, the computer readable program also causes the computing device to manage the functions of the adapter based on the south-side management data in the south-side management data array.

In yet another illustrative embodiment, a system is provided that comprises a host system and an adapter coupled to the host system. The host system may receive a command to modify south-side management data in a south-side management data array associated with an adapter coupled to the computing device. The host system may further retrieve the south-side management data array associated with the adapter from the adapter and may modify at least a portion of the south-side management data in the south-side management data array on the adapter based on the received command. The host system may further manage the functions of the adapter based on the south-side management data in the south-side management data array.

These and other features and advantages of the illustrative embodiments will be described in, or will become apparent to those of ordinary skill in the art in view of, the following detailed description of the invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 11C is an exemplary diagram of a save/restore south-side management structure intended for usage by a non-volatile area of a Hardware Management Console (HMC) in accordance with one illustrative embodiment;

FIG. 11D is an exemplary diagram of a save/restore area of an HMC with exemplary south-side management data in accordance with one illustrative embodiment;

DETAILED DESCRIPTION OF THE INVENTION

Figure 1:
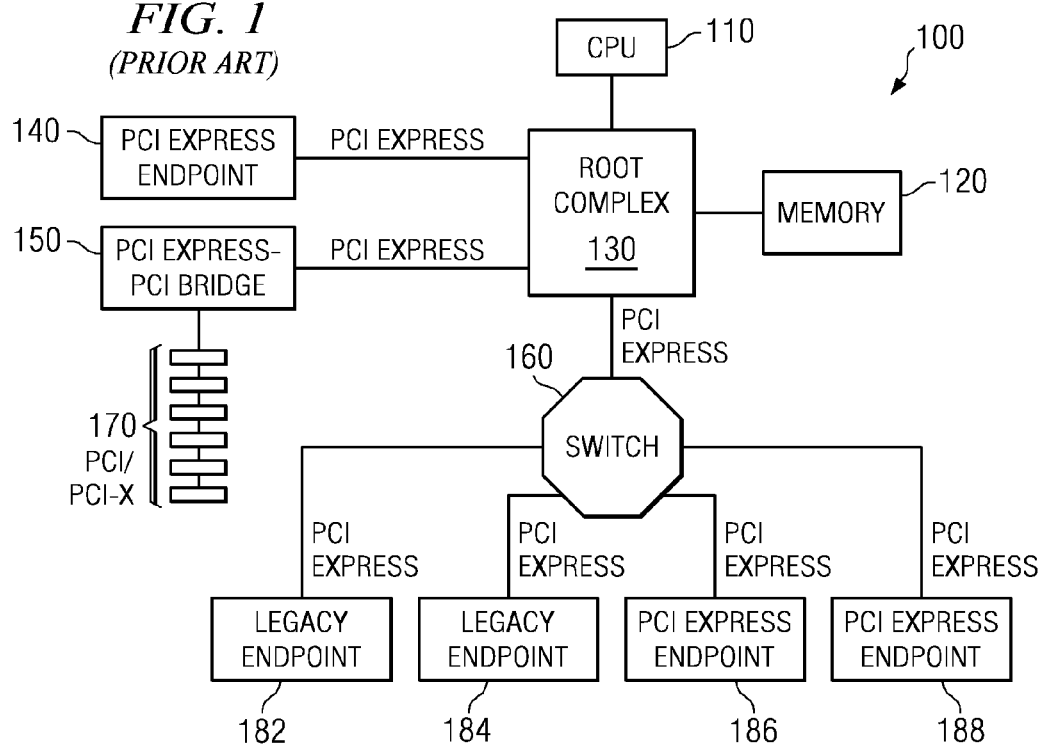
FIG. 1 is an exemplary diagram illustrating a system incorporating a PCIe fabric topology as is generally known in the art.

While the PCI-SIG provides a standard for defining how to design an Input/Output Adapter (IOA) which can be shared by several LPARs, this specification does not define how to manage the device specific data below the PCI hierarchy, which we call the south-side management of the device. This is because the PCI-SIG specification is concerned with setting standards for the operation of the PCIe fabric below the root complex. In other words, the PCI-SIG does not provide any definition of standards for the management of device specific data because that is considered the domain of system houses and device vendors. That is, each of an Intel platform, an IBM Power® platform, and a Sparc platform, for example, may have different system implementation requirements that are not set forth in the PCI-SIG standards.

The illustrative embodiments define a mechanism to manage south side device specific functions. With the mechanism of the illustrative embodiments, a Single Root Peripheral Component Interconnect Manager (SR-PCIM), Multiple Root PCI Manager (MR-PCIM), or other device non-specific code can manage an adapter (also referred to as an "endpoint"), given commands from a management program or user interface. In one illustrative embodiment, the mechanism manages the south-side device specific functions for Peripheral Component Interconnect (PCI) Input/Output Virtualization (IOV) enabled devices. However, the mechanism also works for PCI legacy devices, e.g., non-IOV enabled devices.

In particular, with the mechanisms of the illustrative embodiments, a new data structure is defined for the adapter which is pointed to by the adapter's configuration space. This structure defines a table having entries identifying how the south side resources should be assigned. The table allows the platform specific code, e.g., a hypervisor, to infer the type of device that is being managed. This data structure can be defined with a read-only header that tells the platform specific code, like the hypervisor, what type of parameters are in the table, and then the platform specific code can either copy the entire table to a hardware management console (HMC), where the HMC can populate the data structure and then pass it to the platform specific code to replace the entire data structure on the device, or the HMC can instruct the platform specific code to fill-in the table an entry at a time. Thus, in order to understand the mechanisms of the illustrative embodiments, it is important to first understand how I/O virtualization may be implemented in a system utilizing a hypervisor or other virtualization platform.

It should be appreciated that while the illustrative embodiments will be described with regard to Peripheral Component Interconnect Express (PCIe) adapters or endpoints, the present invention is not limited to such. Rather, the mechanisms of the illustrative embodiments may be implemented in any I/O fabric that supports I/O virtualization within the I/O adapters. Moreover, it should be appreciated that while the illustrative embodiments will be described in terms of an implementation in which a hypervisor is utilized, the present invention is not limited to such. To the contrary, other types of virtualization platforms other than a hypervisor, whether implemented in software, hardware, or any combination of software and hardware, currently known or later developed, may be used without departing from the spirit and scope of the present invention.

Figure 2:
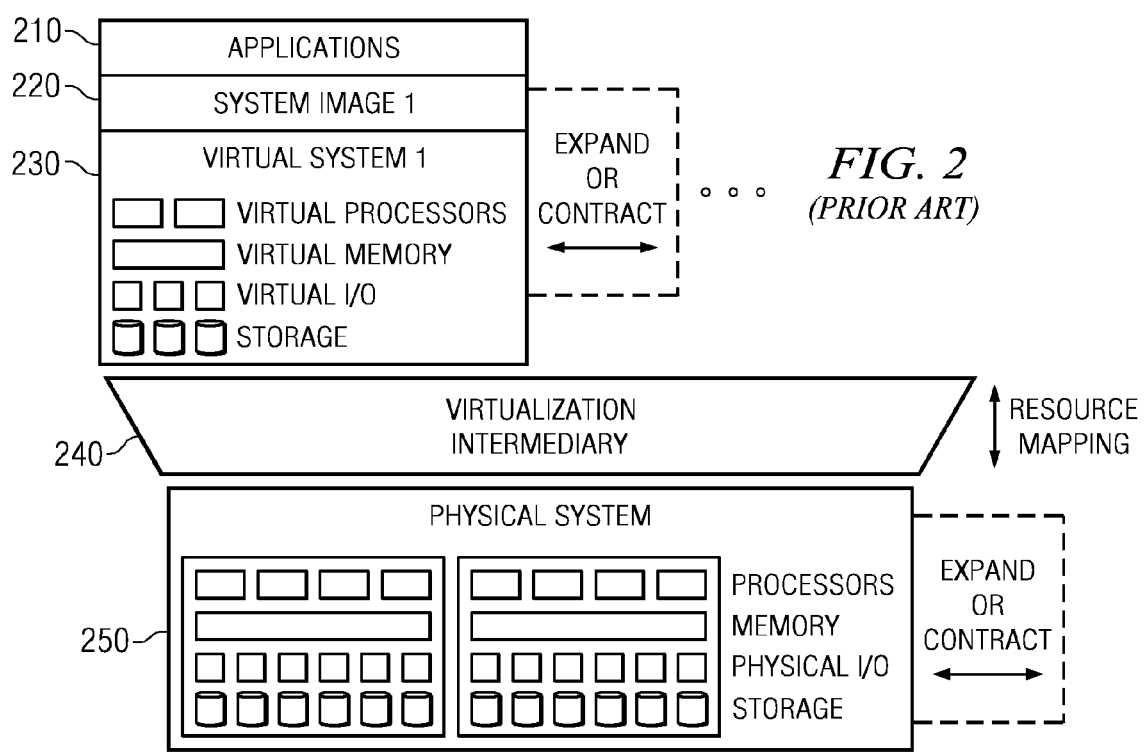
FIG. 2 is an exemplary diagram illustrating system virtualization as is generally known in the art.

FIG. 2 is an exemplary diagram illustrating system virtualization as is generally known in the art. System virtualization is the division of a physical system's processors, memory, I/O adapters, storage, and other resources where each set of resources operates independently with its own system image instance and applications. In such system virtualization, virtual resources are composed from physical resources and operate as proxies for physical resources, e.g., memory, disk drives, and other hardware components with architected interfaces/functions, having the same external interfaces and functions. System virtualization typically utilizes a virtualization layer which creates virtual resources and maps them to the physical resources thereby providing isolation between virtual resources. The virtualization layer is typically provided as one of, or a combination of, software, firmware, and hardware mechanisms.

As shown in FIG. 2, typically in a virtualized system, an application 210 communicates with a system image (SI) 220 which is a software component, such as a general or special purpose operating system, with which specific virtual and physical resources are assigned. The system image 220 is associated with a virtual system 230 which is comprised of the physical or virtualized resources necessary to run a single SI instance, e.g., virtualized processors, memory, I/O adapters, storage, etc.

The system image 220, via the use of the virtual system 230, accesses physical system resources 250 by way of the virtualization layer 240. The virtualization layer 240 manages the allocation of resources to a SI and isolates resources assigned to a SI from access by other SIs. This allocation and isolation is often performed based on a resource mapping performed by the virtualization layer 240 and one or more resource mapping data structures maintained by the virtualization layer 240.

Such virtualization may be used to allow virtualization of I/O operations and I/O resources. That is, with regard to I/O virtualization (IOV), a single physical I/O unit may be shared by more than one SI using the virtualization layer 240 which may be partially or wholly implemented as a hypervisor. The hypervisor may be software, firmware, or the like, that is used to support IOV by intervening on, for example, one or more of configuration, I/O, and memory operations from a SI, and direct memory access (DMA), completion, and interrupt operations to a SI.

Figure 3:
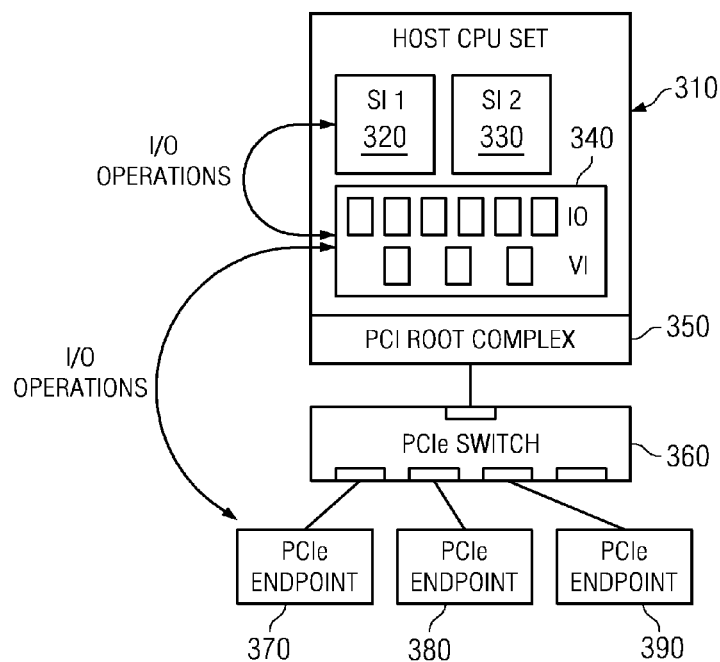
FIG. 3 is an exemplary diagram illustrating a first approach for virtualizing I/O of a PCI root complex using a virtualization layer.

FIG. 3 is an exemplary diagram illustrating a first approach to virtualizing I/O of a PCI root complex using a virtualization layer. As shown in FIG. 3, a host processor set 310, which may be one or more processors of a chip, motherboard, blade, or the like, may support a plurality of system images 320-330 through which applications (not shown) may access system resources, such as PCIe endpoints 370-390. The system images communicate with the virtualized resources via the virtualization layer 340, PCIe root complex 350, and one or more PCIe switches 360, and/or other PCIe fabric elements.

With the approach illustrated in FIG. 3, the virtualization layer 340, which may be implemented partially or wholly as a hypervisor or other type of virtualization platform, is involved in all I/O transactions and performs all I/O virtualization functions. For example, the virtualization layer 340 multiplexes I/O requests from the various SI's I/O queues onto a single queue in the PCIe endpoints 370-390. Thus, the virtualization layer 340 acts as a proxy between the SIs 320-330 and the physical PCIe endpoints 370-390.

Figure 4:
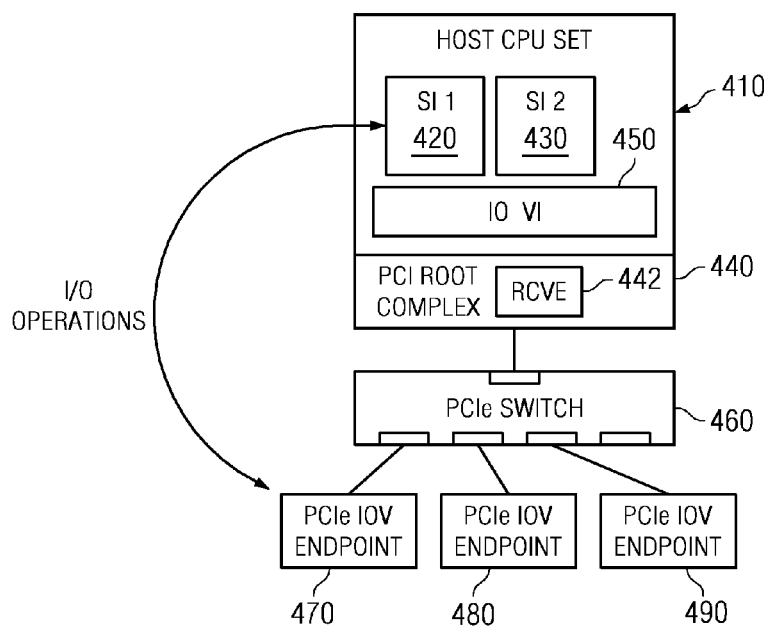
FIG. 4 is an exemplary diagram illustrating a second approach for virtualizing I/O of a PCI root complex using natively shared PCI I/O adapters.

FIG. 4 is an exemplary diagram illustrating a second approach to virtualizing I/O of a PCI root complex using natively shared PCI I/O adapters. As shown in FIG. 4, a host processor set 410, which may be one or more processors of a chip, motherboard, blade, or the like, may support a plurality of system images 420-430 through which applications (not shown) may access system resources, such as PCIe I/O virtualization (IOV) endpoints 470-490. The system images 420-430 communicate with the virtualized resources via the PCIe root complex 440 and one or more PCIe switches 460, and/or other PCIe fabric elements.

The PCIe root complex 440 includes root complex virtualization enablers (RCVE) 442 which may comprise one or more address translation and protection table data structures, interrupt table data structures, and the like, that facilitate the virtualization of I/O operations with IOV enabled endpoints 470-490. The address translation and protection table data structures may be used by the PCIe root complex 440 to perform address translation between virtual and real addresses for virtualized resources, control access to virtual resources based on a mapping of virtual resources to SIs, and other virtualization operations, for example. These root complexes interrupt table data structures are accessible through the PCIe memory address space and are used to map interrupts to appropriate interrupt handlers associated with SIs, for example.

As with the approach shown in FIG. 3, a virtualization layer 450 is provided in the virtualization structure of FIG. 4 as well. The virtualization layer 450 is used with non-IOV enabled PCIe endpoints that may be coupled to the PCIe switch 460. That is, the virtualization layer 450, which may be partially or wholly implemented as a hypervisor or other virtualization platform, is utilized with PCIe endpoints in a similar manner as described previously above with regard to FIG. 3 for those PCIe endpoints that do not have native, i.e. internal to the endpoint, support for I/O virtualization (IOV).

For IOV enabled PCIe endpoints 470-490, the virtualization layer 450 is used primarily for configuration transaction purposes and is not involved in memory address space operations, such as memory mapped input/output (MMIO) operations initiated from a SI or direct memory access (DMA) operations initiated from the PCIe endpoints 470-490. To the contrary, data transfers between the SIs 420-430 and the endpoints 470-490 are performed directly without intervention by the virtualization layer 450. Direct I/O operations between the SIs 420-430 and the endpoints 470-490 is made possible by way of the RCVEs 442 and the built-in I/O virtualization logic, e.g., physical and virtual functions, of the IOV enabled PCIe endpoints 470-490. The ability to perform direct I/O operations greatly increases the speed at which I/O operations may be performed, but requires that the PCIe endpoints 470-490 support I/O virtualization.

Figure 5:
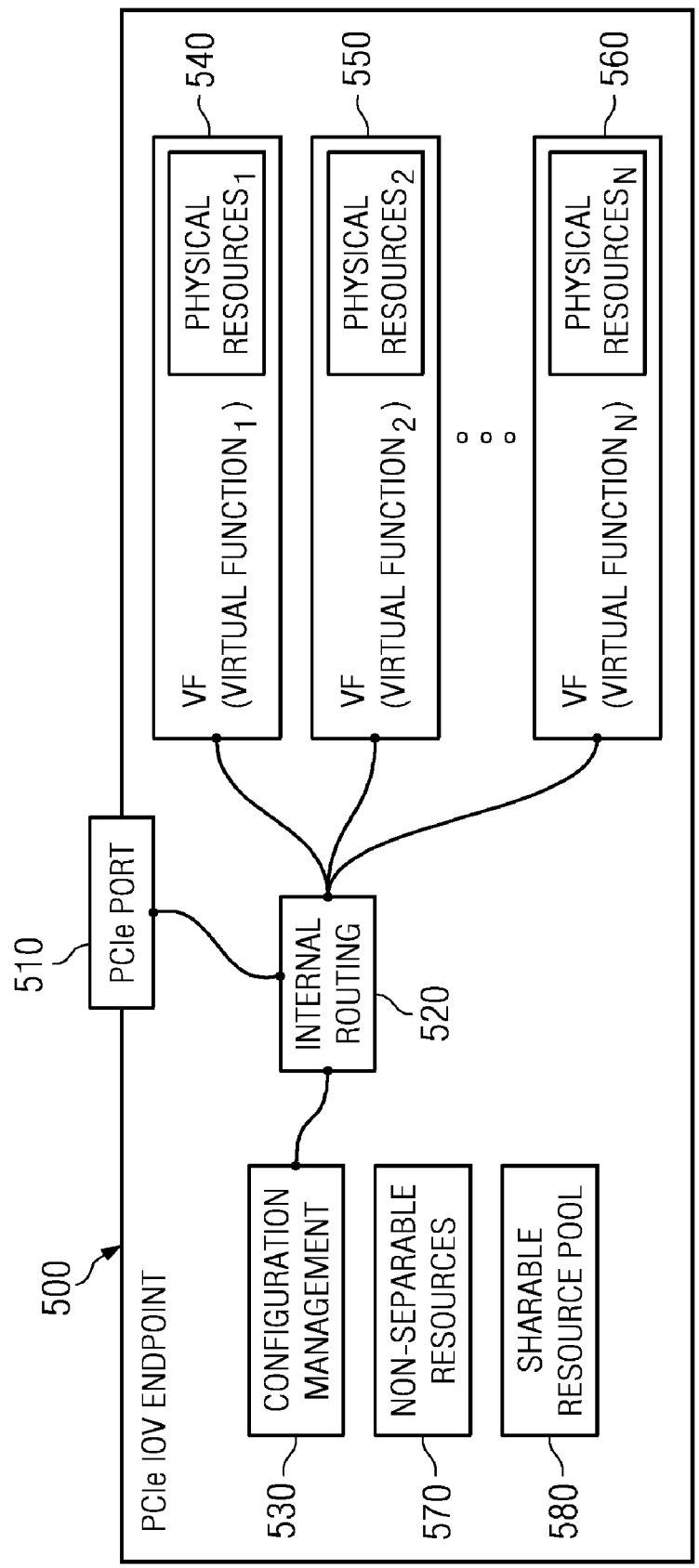
FIG. 5 is an exemplary diagram of a PCIe I/O virtualization enabled endpoint.

FIG. 5 is an exemplary diagram of a PCIe I/O virtualization (IOV) enabled endpoint. As shown in FIG. 5, the PCIe IOV endpoint 500 includes a PCIe port 510 through which communications with PCIe switches, and the like, of a PCIe fabric may be performed. Internal routing 520 provides communication pathways to a configuration management function 530 and a plurality of virtual functions (VFs) 540-560. The configuration management function 530 may be a physical function (PF) as opposed to the virtual functions 540-560. A physical "function," as the term is used in the PCI specifications, is a set of logic that is represented by a single configuration space. In other words, a physical "function" is circuit logic that is configurable based on data stored in the function's associated configuration space in a memory, such as may be provided in the non-separable resources 570, for example.

The configuration management function 530 may be used to configure the virtual functions 540-560. The virtual functions are functions, within an I/O virtualization enabled endpoint, that share one or more physical endpoint resources, e.g. a link, and which may be provided in the sharable resource pool 580 of the PCIe IOV endpoint 500, for example, with another function. The virtual functions can, without run-time intervention by a hypervisor, directly be a sink for I/O and memory operations from a system image, and be a source of Direct Memory Access (DMA), completion, and interrupt operations to a system image (SI).

PCIe adapters/endpoints may have many different types of configurations with regard to the "functions" supported by the PCIe adapters/endpoints. For example, endpoints may support a single physical function (PF), multiple independent PFs, or even multiple dependent PFs. In endpoints that support native I/O virtualization, each PF supported by the endpoints may be associated with one or more virtual functions (VFs), which themselves may be dependent upon VFs associated with other PFs. Exemplary relationships between physical and virtual functions will be illustrated in FIGS. 6 and 7 hereafter.

Figure 6:
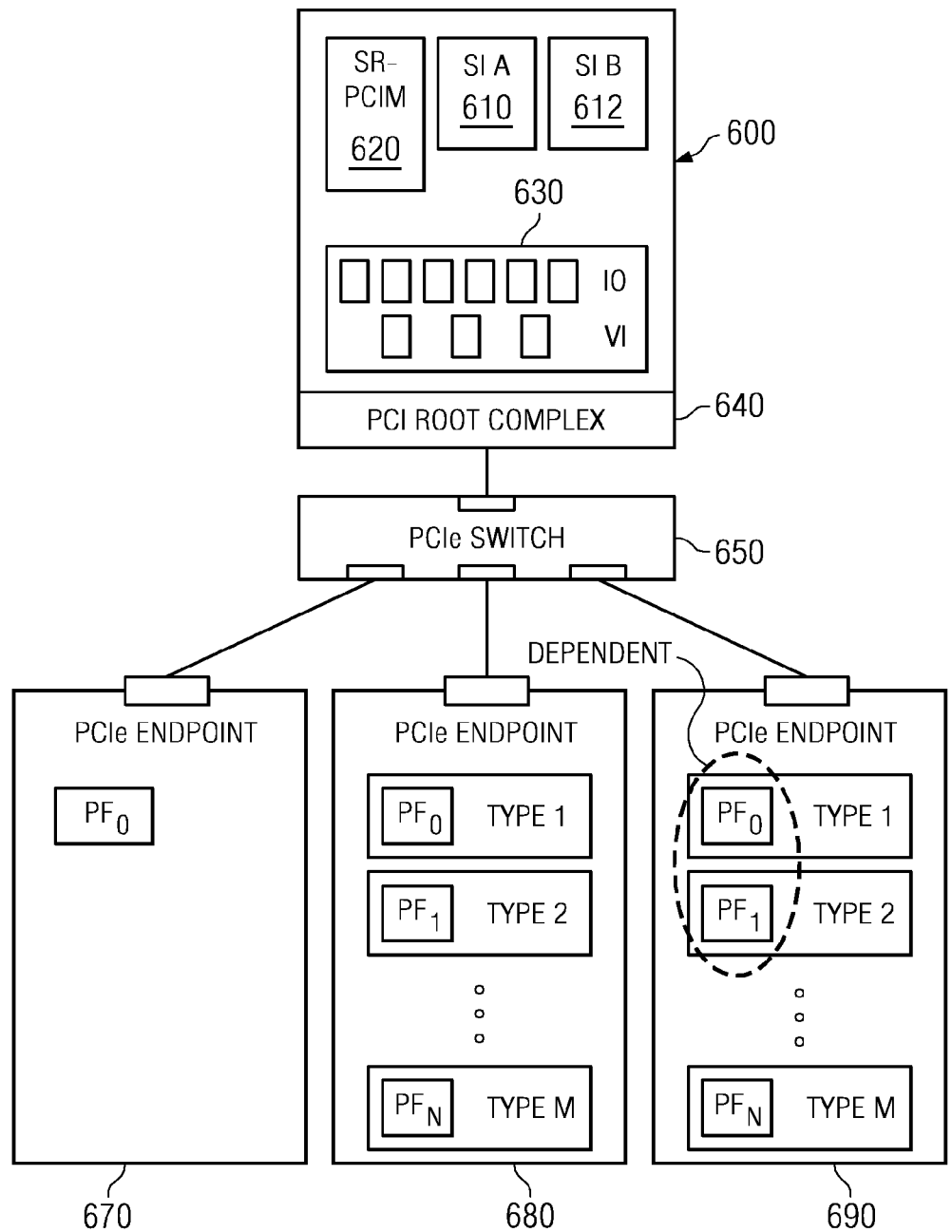
FIG. 6 is an exemplary diagram illustrating physical and virtual functions of single root endpoints without native virtualization.

FIG. 6 is an exemplary diagram illustrating physical and virtual functions of single root endpoints without native virtualization. The term "single root endpoints" refers to an endpoint that is associated with a single root complex of a single root node, i.e. a single host system. With a single root endpoint, the endpoint may be shared by a plurality of system images (SIs) associated with a single root complex, but cannot be shared among a plurality of root complexes on the same or different root nodes.

As shown in FIG. 6, the root node 600 includes a plurality of system images 610, 612, which communicate with PCIe endpoints 670-690, an I/O virtualization intermediary 630 (which is used as previously described), PCIe root complex 640, and one or more PCIe switches 650 and/or other PCIe fabric elements. The root node 600 further includes a single root PCIe configuration management (SR-PCIM) unit 620. The SR-PCIM unit 620 is responsible for managing the PCIe fabric, which includes the root complex 640, the one or more PCIe switches 650, and the like, and the endpoints 670-690. The management responsibilities of SR-PCIM 620 include determination of which functions are to be assigned to which SIs 610, 612 and the setup of the configuration space of the endpoints 670-690. The SR-PCIM 620 may configure the functions of the various endpoints 670-690 based on a SI's capabilities and input from a user, such as a system administrator, or load balancing software as to which resources are to be assigned to which SIs 610, 612. A SI's capabilities may include various factors including how much address space is available to allocate to the endpoint 670-690, how many interrupts are available to be assigned to the endpoint 670-690, and the like.

Each of the PCIe endpoints 670-690 may support one or more physical functions (PFs). The one or more PFs may be independent of each other or may be dependent upon each other in some fashion. A PF may be dependent upon another PF based on vendor defined function dependencies wherein one PF requires the operation of another PF or the result generated by another PF, for example, in order to operate properly. In the depicted example, PCIe endpoint 670 supports a single PF and PCIe endpoint 680 supports a plurality of independent PFs, i.e. $PF_0$ to $PF_N$, of different types 1 to M. A type relates to the functionality of the PF or VF, e.g., an Ethernet function and a Fiber Channel function are two different types of functions. Endpoint 690 supports multiple PFs of different types with two or more of the PFs being dependent. In the depicted example, $PF_0$ is dependent upon $PF_1$, or vice versa.

In the example shown in FIG. 6, the endpoints 670-690 are shared by the system images (SIs) 610 and 612 through the virtualization mechanisms made available by the I/O virtualization intermediary (IOVI) 630. As described previously, in such an arrangement, the IOVI 630 is involved in all PCIe transactions between the SIs 610, 612 and the PCIe endpoints 670-690. The individual PCIe endpoints 670-690 need not support virtualization in themselves since the burden of handling the virtualization is placed entirely on the IOVI 630. As a result, while known mechanisms for virtualization may be used in such an arrangement, the rate by which I/O operations may be performed is relatively slow compared to the potential for I/O rates if the IOVI 630 were not involved in every I/O operation.

Figure 7:
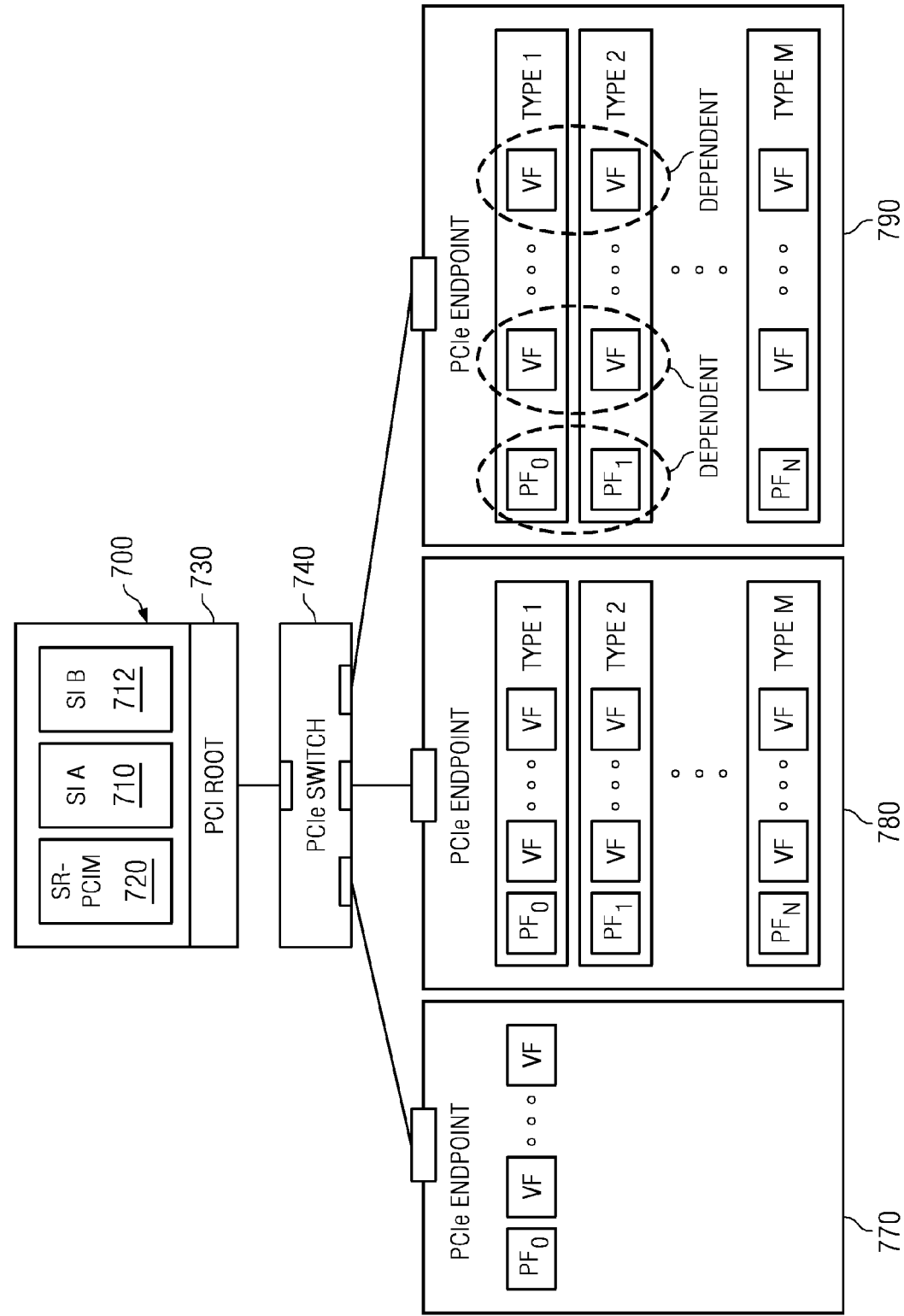
FIG. 7 is an exemplary diagram illustrating physical and virtual functions of single root endpoints enabled for native I/O virtualization.

FIG. 7 is an exemplary diagram illustrating physical and virtual functions of single root endpoints enabled for native I/O virtualization. The arrangement shown in FIG. 7 is similar to that of FIG. 6 with some important differences due to the PCIe endpoints 770-790 supporting I/O virtualization (IOV) natively, i.e. within the endpoints themselves. As a result, the I/O virtualization intermediary 630 in FIG. 6 may be effectively eliminated, except of course for configuration operations, with regard to the IOV enabled PCIe endpoints 770-790. However, if non-IOV enabled PCIe endpoints (not shown) are also utilized in the arrangement, e.g., legacy endpoints, an I/O virtualization intermediary may be used in conjunction with the elements shown in FIG. 7 to handle sharing of such non-IOV enabled PCIe endpoints between the system images 710 and 712.

As shown in FIG. 7, the IOV enabled PCIe endpoints 770-790 may support one or more independent or dependent physical functions (PFs) which in turn may be associated with one or more independent or dependent virtual functions (VFs). In this context, the PFs are used by the SR-PCIM 720 to manage a set of VFs and are also used to manage endpoint functions, such as physical errors and events. The configuration spaces associated with the PFs define the capabilities of the VFs including the maximum number of VFs associated with the PF, combinations of the PFs and VFs with other PFs and VFs, and the like.

The VFs are used by SIs to access resources, e.g., memory spaces, queues, interrupts, and the like, on the IOV enabled PCIe endpoints 770-790. Thus, a different VF is generated for each SI 710, 712 which is going to share a specific PF. VFs are generated by the endpoint 770-790 based on the setting of the number of VFs by the SR-PCIM 720 in the configuration space of the corresponding PF. In this way, the PF is virtualized so that it may be shared by a plurality of SIs 710, 712.

As shown in FIG. 7, the VFs and PFs may be dependent upon other VFs and PFs. Typically, if a PF is a dependent PF, then all of the VFs associated with that PF will also be dependent. Thus, for example, the VFs of the $PF_0$ may be dependent upon corresponding VFs of $PF_1$.

With the arrangement shown in FIG. 7, the SIs 710, 712 may communicate directly, via the PCI root complex 730 and PCIe switch 740, with the IOV enabled PCIe endpoints 770-790 and vice versa without the need for involvement by an I/O virtualization intermediary. Such direct communication is made possible by virtue of the IOV support provided in the endpoints 770-790 and in the SR-PCIM 720, which configures the PFs and VFs in the endpoints 770-790.

The direct communication between the SIs and the endpoints greatly increases the speed at which I/O operations may be performed between a plurality SIs 710, 712 and shared IOV enabled PCIe endpoints 770-790. However, in order for such performance enhancements to be made possible, the PCIe endpoints 770-790 must support I/O virtualization by providing mechanisms in the SR-PCIM 720 and the physical functions (PFs) of the endpoints 770-790 for generating and managing virtual functions (VFs).

The above illustrations of a PCIe hierarchy are limited to single root hierarchies. In other words, the PCIe endpoints are only shared by SIs 710, 712 on a single root node 700 associated with a single PCI root complex 730. The mechanisms described above do not provide support for multiple root complexes sharing the PCIe endpoints. Thus, multiple root nodes cannot be provided with shared access to the resources of a PCIe endpoint. This limits the scalability of systems utilizing such arrangements since a separate set of endpoints is required for each root node.

The illustrative embodiments herein may make use of multi-root I/O virtualization in which multiple PCI root complexes may share access to the same set of IOV enabled PCIe endpoints. As a result, the system images associated with each of these PCI root complexes may each share access to the same set of IOV enabled PCIe endpoint resources but with the protections of virtualization being in place for each SI on each root node. Thus, scalability is maximized by providing a mechanism for allowing addition of root nodes and corresponding PCI root complexes which may share the same existing set of IOV enabled PCIe endpoints.

Figure 8:
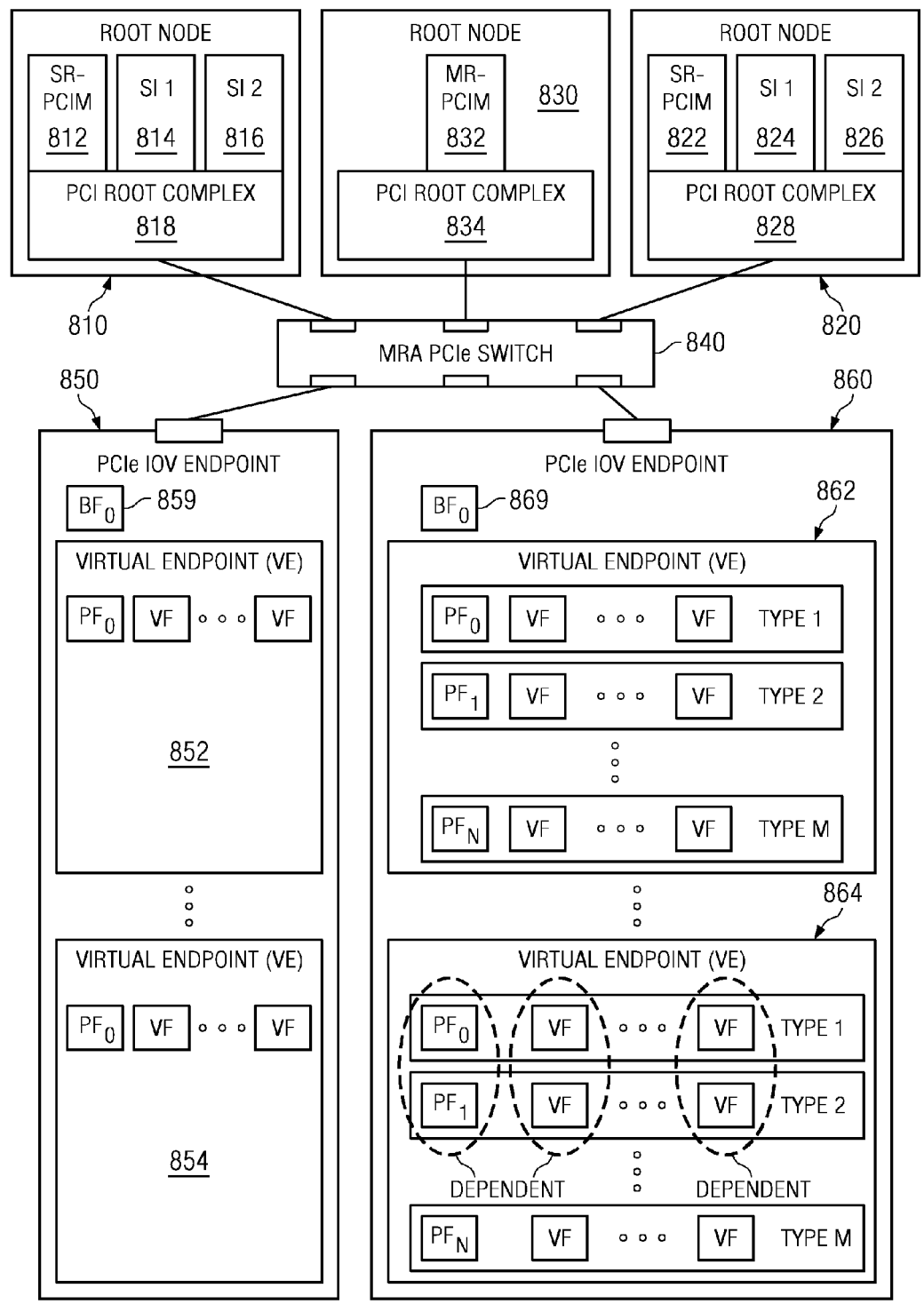
FIG. 8 is an exemplary diagram illustrating a multi-root virtualized I/O topology in accordance with one illustrative embodiment.

FIG. 8 is an exemplary diagram illustrating a multi-root virtualized I/O topology in accordance with one illustrative embodiment. As shown in FIG. 8, a plurality of root nodes 810 and 820 are provided with each root node having a single root PCI configuration manager (SR-PCIM) 812, 822, one or more system images (SIs) 814, 816, 824, and 826, and a PCI root complex 818 and 828. These root nodes 810 and 820, which may be, for example, blades in a blade server, are coupled to one or more multi-root aware (MRA) PCIe switches 840 of a PCIe switch fabric which may include one or more such MRA PCIe switches 840, and/or other PCIe fabric elements. The MRA switch 840 is of a different type than the non-MRA switch 740 in FIG. 7 in that the MRA switch 840 has connections for additional root nodes and contains the mechanisms required for keeping the address spaces of those different root nodes separate and distinct.

In addition to these root nodes 810 and 820, a third root node 830 is provided that includes a multi-root PCI configuration manager (MR-PCIM) 832 and corresponding PCI root complex 834. The MR-PCIM 832 is responsible for discovering and configuring virtual hierarchies within the multi-root (MR) topology shown in FIG. 8, as will be discussed in greater detail hereafter. Thus, the MR-PCIM 832 configures the physical and virtual functions of the endpoints with regard to multiple root complexes of multiple root nodes. The SR-PCIMs 812 and 822 configure the physical and virtual functions of their associated single root complex. In other words, the MR-PCIM sees the MR topology as a whole, while the SR-PCIM sees only its own virtual hierarchy within the MR topology, as described in greater detail hereafter.

As shown in FIG. 8, the IOV enabled PCIe endpoints 850 and 860 support one or more virtual endpoints (VEs) 852, 854, 862, and 864. A VE is a set of physical and virtual functions assigned to a root complex. Thus, for example, a separate VE 852 and 862 are provided on the IOV enabled PCIe endpoints 850 and 860 for the PCI root complex 818 of root node 810. Similarly, a separate VE 854 and 864 are provided on the IOV enabled PCIe endpoints 850 and 860 for the PCI root complex 828 of root node 820.

Each VE is assigned to a virtual hierarchy (VH) having a single root complex as the root of the VH and the VE as a terminating node in the hierarchy. A VH is a fully functional PCIe hierarchy that is assigned to a root complex or SR-PCIM. It should be noted that all physical functions (PFs) and virtual functions (VFs) in a VE are assigned to the same VH.

Each IOV enabled PCIe endpoint 850 and 860 supports a base function (BF) 859 and 869. The BF 859, 869 is a physical function used by the MR-PCIM 832 to manage the VEs of the corresponding endpoint 850, 860. For example, the BF 859, 869 is responsible for assigning functions to the VEs of the corresponding endpoints 850, 860. The MR-PCIM 832 assigns functions to the VEs by using the fields in the BF's configuration space that allows assignment of a VH number to each of the PFs in the endpoint 850, 860. In the illustrative embodiments, there can be only one BF per endpoint, although the present invention is not limited to such.

As shown in FIG. 8, each VE 852, 854, 862, and 864 may support their own set of physical and virtual functions. As described previously, such sets of functions may include independent physical functions, dependent physical functions, and their associated independent/dependent virtual functions. As shown in FIG. 8, VE 852 supports a single physical function ($PF_O$) with its associated virtual functions (VFs). VE 854 likewise supports a single physical function ($PF_O$) with its associated virtual functions (VFs). VE 862 supports a plurality of independent physical functions ($PF_O$-$PF_N$) and their associated virtual functions (VFs). VE 864, however, supports a plurality of dependent physical functions ($PF_O$-$PF_N$).

A VE 852, 854, 862, or 864 may directly communicate with the SIs 814, 816, 824, and 826 of the root nodes 810 and 820, if and only if the VE is assigned to a VH to which the SI has access, and vice versa. The endpoints 850 and 860 themselves must support single root I/O virtualization, such as described previously above, and multi-root I/O virtualization as described with regard to the present illustrative embodiments. This requirement is based on the fact that the topology supports multiple root complexes but each individual root node sees only its associated single root based virtual hierarchy.

Figure 9:
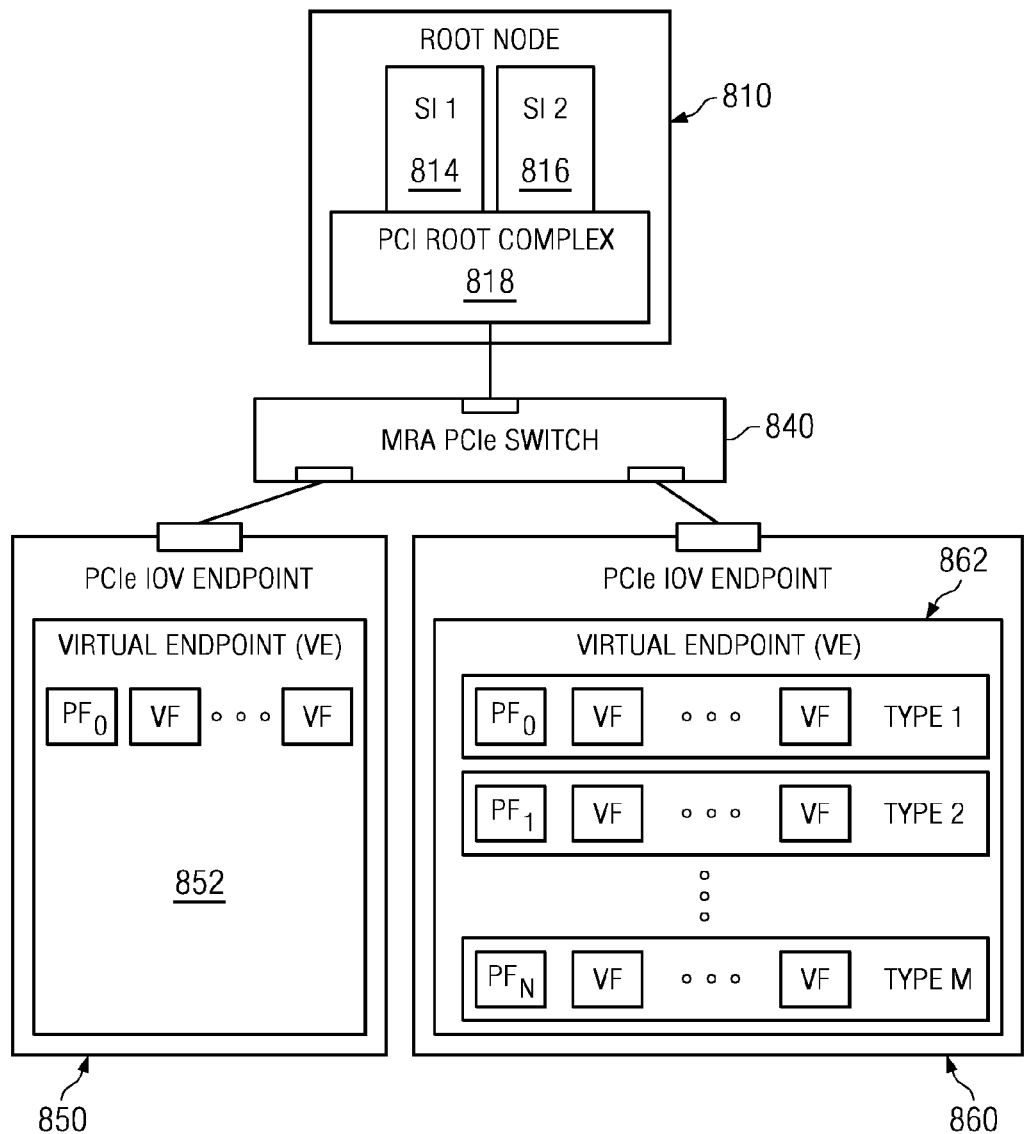
FIG. 9 is an exemplary diagram illustrating a virtual hierarchy view of a multi-root virtualized I/O topology from the viewpoint of a SR-PCIM of a root node in accordance with one illustrative embodiment.

FIG. 9 is an exemplary diagram illustrating a virtual hierarchy view of a multi-root virtualized I/O topology from the viewpoint of a root complex of a root node in accordance with one illustrative embodiment. As shown in FIG. 9, while the multi-root (MR) topology may be as shown in FIG. 8, each root complex of each individual root node views only its portion of the MR topology. Thus, for example, the PCI root complex 818 associated with root node 810 sees its host processor set, its own system images (SIs) 814, 816, the MRA switch 840, and its own virtual endpoints (VEs) 852 and 862. There is full PCIe functionality within this virtual hierarchy, however, the PCI root complex 818 does not see the VEs, root complexes, system images, etc, that are not part of its own virtual hierarchy.

Figure 10:
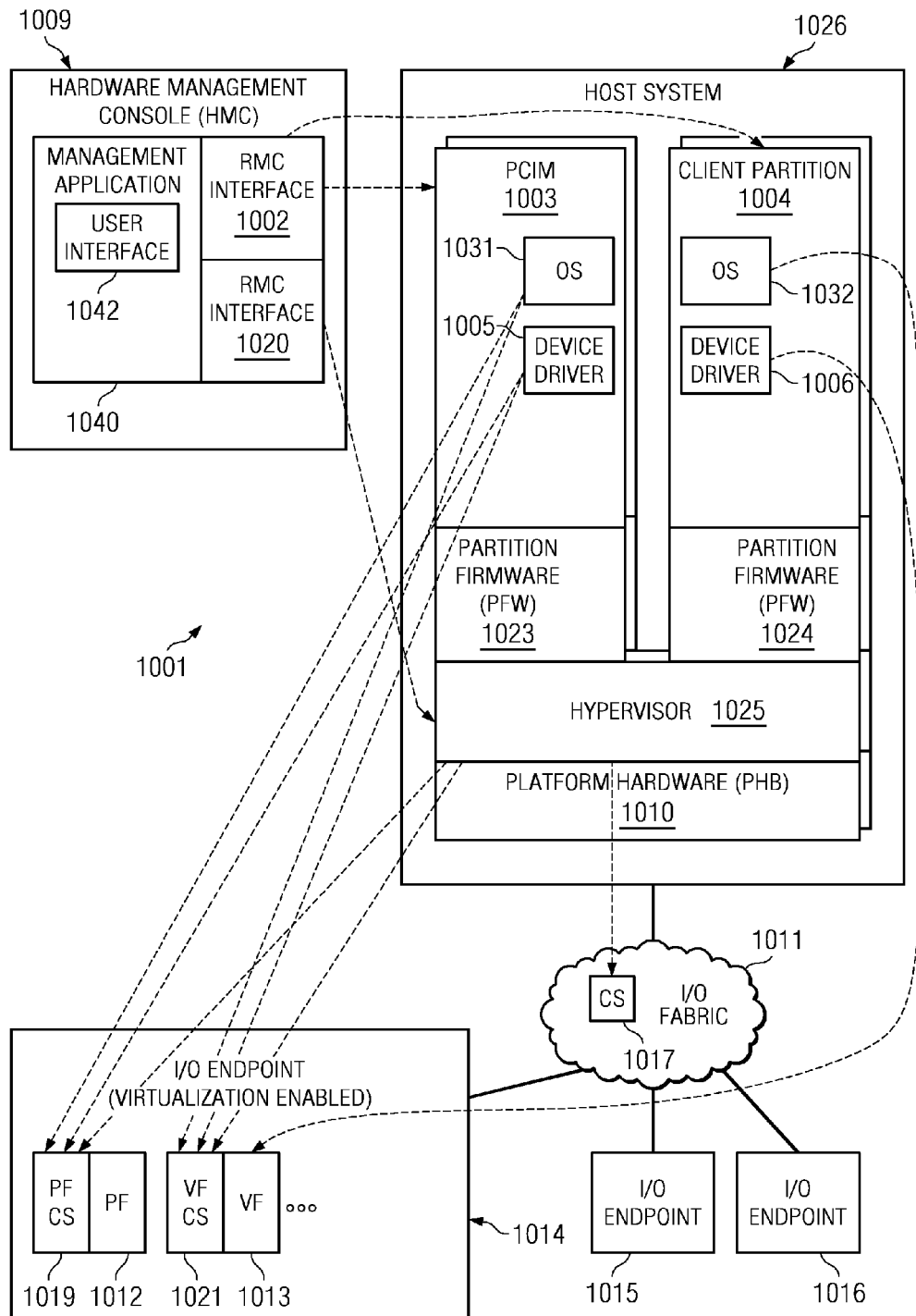
FIG. 10 is an exemplary diagram of a system structure in which IOV enabled endpoints, or adapters, are utilized in accordance with one illustrative embodiment.

FIG. 10 is an exemplary diagram of a system structure in which IOV enabled endpoints, or adapters, are utilized in accordance with one illustrative embodiment. The mechanisms shown in FIG. 10 may be implemented in conjunction with the mechanisms illustrated in FIG. 4. For example, the PCI manager (PCIM) 1003 shown in FIG. 10, which may be either a Single Root (SR) or Multiple Root (MR) PCIM, may be provided in association with system image 1 420 in FIG. 4 while client partition 1004 in FIG. 10 may be provided in association with system image 2 430 of FIG. 4. Similarly, the I/O fabric 1011 of FIG. 10 may include the PCIe switch 460 in FIG. 4, IOV endpoint 1014 may be similar to any one of PCIe endpoints 470-490 in FIG. 4, and endpoints 1015 and 1016 may be either IOV enabled endpoints or non-IOV enabled endpoints, such as endpoints 370-390 in FIG. 3.

As shown in FIG. 10, the system 1001 comprises a host system 1026 which may be any data processing device, e.g., a server, client computing device, or the like, an I/O fabric 1011 (e.g., a PCIe fabric) which may include one or communication links and one or more switches, and one or more I/O endpoints 1014-1016 which may be, in one illustrative embodiment, PCIe I/O endpoints with I/O endpoint 1014 being an I/O virtualization (IOV) enabled endpoint while the other endpoints 1015-1016 may be IOV enabled or non-IOV enabled endpoints. The host system 1026 comprises platform hardware 1010 which is the underlying hardware of the data processing device, a hypervisor 1025, logical partitions (LPARS) 1003 and 1004, and corresponding partition firmware (PFW) 1023 and 1024. While the illustrative embodiments are described herein with regard to use with a hypervisor 1025, it will be appreciated that other types of virtualization platforms may be utilized without departing from the spirit and scope of the present invention as previously mentioned above.

The hypervisor 1025, in one illustrative embodiment, may be code that executes on the platform hardware 1010, and is part of the platform's firmware. Similarly, the partition firmware (PFW) 1023-1024 may also be part of the platform's firmware, but is shown in association with the LPARs 1003 and 1004 since they are logically considered to be part of the LPARs' code executing within the LPAR.

The LPARs 1003 and 1004 have allocated resources and an operating system image or instance that executes within the LPAR. In addition, the LPARs 1003 and 1004 may execute other applications, software, code, or the like within the LPAR. For example, with particular importance to the illustrative embodiment's one of the LPARs, e.g., LPAR 1003, executes code that causes the LPAR 1003 to operate as a SR-PCIM or MR-PCIM 1003 (collectively referred to as simply a "PCIM" hereafter). Other LPARs 1004 may operate as client partitions. While only one PCIM 1003 and one client partition 1004 are shown in FIG. 10, it should be appreciated that more than one PCIM 1003 and client partition 1004 may be provided in a host system 1026 without departing from the spirit and scope of the illustrative embodiments.

The hypervisor 1025 has access to configuration spaces 1019, 1021 of the IOV endpoint 1014 and to the I/O fabric 1011 configuration space 1017. The term "configuration space" as it is used herein refers to a disjoint address space from the memory mapped I/O (MMIO) address space, which is memory on the I/O adapter that is mapped by the host operating system for addressability by the host operating system, which is allocated for use in storing configuration data for a particular component of the system 1001. Further, the PCIM's operating system 1031 and device driver 1005 have access to the configuration space 1019 for the Physical Functions (PFs) 1012 when they are assigned to the PCIM 1003, and have access to the configuration spaces 1021 of the Virtual Functions (VFs) that belong to the PF assigned to the PCIM 1003.

A management application 1040 on a Hardware Management Console (HMC) 1009, which may be resident on the host system 1026 or in a separate data processing device (as shown), and the HMC 1009 itself communicate through a Remote Management Command (RMC) interface 1002 to the PCIM 1003 and client partitions 1004 and through the same type interface 1020 to the hypervisor 1025. The management application 1040 (referred to hereafter collectively with the HMC 1009 as simply the HMC 1009), acts as the orchestrator to control functionality across the various components in the system 1001, and provides a user interface 1042 for a human to view system configurations and to input information about what resources that they want assigned to what LPARs 1003-1004. The management application 1040 may provide many different functions which may be invoked by the user as described in greater detail hereafter. Alternatively, these functions may be automatically invoked without user intervention in response to an event or input triggering the initiation of such functions.

The illustrative embodiments define a mechanism to manage south side device specific functions. With the mechanism of the illustrative embodiments, a Single Root Peripheral Component Interconnect Manager (SR-PCIM), Multiple Root PCI Manager (MR-PCIM), or other device non-specific code can manage an adapter (also referred to as an "endpoint"), given commands from a management program or user interface. In one illustrative embodiment, the mechanism manages the south-side device specific functions for Peripheral Component Interconnect (PCI) Input/Output Virtualization (IOV) enabled devices. However, the mechanism also works for PCI legacy devices, e.g., non-IOV enabled devices.

In particular, with the mechanisms of the illustrative embodiments, a new data structure is defined for the adapter which is pointed to by the adapter's configuration space. This structure defines a table having entries identifying how the south side resources should be assigned. The table allows the platform specific code, e.g., a hypervisor, to infer the type of device that is being managed. This data structure can be defined with a read-only header that tells the platform specific code, like the hypervisor, what type of parameters are in the table, and then the platform specific code can either copy the entire table to a hardware management console (HMC), where the HMC can provide an interface to populate the data structure and then pass it to the platform specific code to replace the entire data structure in device memory, or the HMC can instruct the platform specific code to fill-in the table an entry at a time.

Figure 11A:
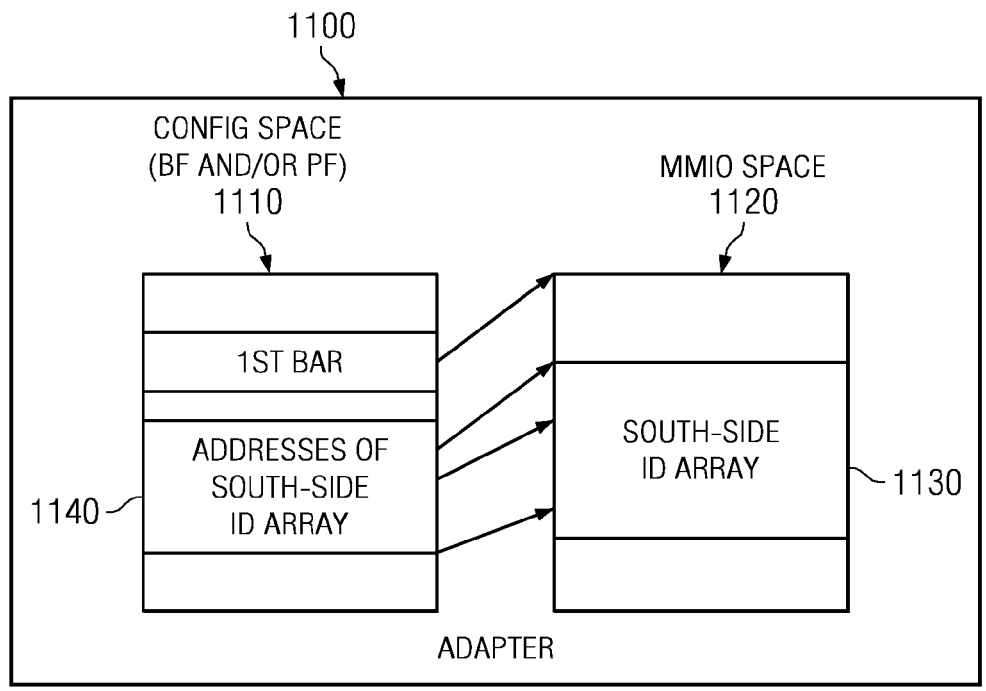
FIG. 11A is an exemplary diagram of the PCI configuration space for a Physical Function (PF) in a SR IOV case and a Base Function (BF) in a MR IOV case in accordance with one illustrative embodiment.

FIG. 11A is an exemplary diagram illustrating a configuration space for a PF in the Single Root Input/Output Virtualization (SR-IOV) case and a BF in a Multiple Root Input/Output Virtualization (MR-IOV) case. As shown in FIG. 11A, the configuration space 1110, which may be provided in the adapter 1100 itself, includes a first Base Address Register (BAR) which points to a beginning address within a memory mapped I/O (MMIO) address space 1120. The MMIO address space 1120 refers to memory on the adapter 1100 that is mapped for addressability by the host operating system. The MMIO space 1120 is addressed for programmability by a bus address much like the system memory. The configuration space 1110 consists of memory and registers on the I/O adapter that are addressed by requester ID (RID) and register number (e.g., bus number, device number, function number, and register number).

In addition, the configuration space 1110 for the BF or PF includes pointers 1140, or addresses, which point to a portion 1130 of the MMIO address space 1120 that contains the south-side ID array 1130. In particular, individual pointers 1140 point to entries within the south-side ID array 1130 for the particular south side resources. The configuration space 1110 is populated by system firmware during discovery and enumeration of the devices. The system firmware creates the south-side ID array 1130 which is stored in adapter 1100 MMIO memory 1120, which again is memory mapped by the host operating system. The pointers in the configuration space 1110 enable a hypervisor to access the south-side device information.

That is, the configuration space 1110 may be accessed by a hypervisor, or other I/O virtualization platform, to discover various configuration characteristics of the associated adapter 1100 once the associated adapter 1100 is discovered by the hypervisor. For example, in response to a PCIe fabric power on being performed, the hypervisor 1025 in FIG. 10 for example, may discover, such as by probing a configuration space of the I/O fabric, all the I/O adapters (IOAs) 1014-1016 coupled to the I/O fabric 1011 in FIG. 10, and which of the discovered adapters are IOV adapters 1014, such as by detection of the IOV configuration space.

Once the adapter 1100 is discovered by the hypervisor 1025, the functions of the adapter 1100 may be discovered. The hypervisor 1025, system firmware, or the like, discovers switches, bridges, adapters, and the like by "walking" the PCI bus and probing for PCI capability structures. With regard to adapters, this is done by addressing configuration space 1110 by requester ID and register number (e.g., bus number, device number, function number, and register number). That is, the bus/dev/func are each sequentially incremented while "probing" to find all the active functions on all adapters.

The hypervisor 1025 may then determine which functions are physical functions (PFs) by looking to the presence of an associated SR-IOV extended capability structure in the configuration space of the PFs, e.g., configuration space 1019 in FIG. 10. In PCI-Express, the capability structure is a data structure which, during device discovery, enables the system firmware/hypervisor to identify the device as a PCI-Express type of device. Additionally, the presence of the SR-IOV extended capability structure indicates the device is IOV capable. Only IOV capable devices have PF's.

For the PFs, the number of VFs that are supported by each PF is determined based on an InitialPFs field of the SR-IOV extended capability structure in the PFs. Moreover, the hypervisor 1025 discovers the resources needed for all the VFs and any system resource limitations, for example the MMIO address space available, DMA address space available, or the number of interrupts available, restrictions, number of partitionable endpoint references, and the like.

The information gathered by the above discovery operations is presented to the HMC 1009 in FIG. 10. This information, which may include, for example, the Vendor ID, Device ID, number of PFs supportable, and the number of VFs supportable, etc., is needed by the HMC 1009, or the user at the HMC 1009, to determine how to configure the adapter 1100. The information on the number of functions that can be supported may be limited by the resources available to that adapter, such as address space limitations or number of interrupts available.

In addition to the information gathered through the above discovery operations, the mechanisms of the illustrative embodiments further allow the hypervisor 1025 to discover the south-side ID array 1130 for a particular adapter 1100, in the MMIO address space 1120 via the pointers 1140 in the configuration space 1110 of the BF or PF of the adapter 1100. This configuration space 1110 may be the PF configuration space 1019 in FIG. 10, for example. The south-side ID array 1130 comprises entries having south-side management data, e.g., World Wide Port Name (WWPN), Media Access Control (MAC) addresses, and the like, for the various resources that may be assigned to the functions of the adapter 1100. It should be noted that south-side management data such as this may be pre-loaded in the adapter 1100 as provided by the adapter manufacturer. Moreover, a vendor or consumer of the host computing system may load south-side management data (e.g., IP address) from the host system when "private" south-side management data is desired. The south-side management data may be passed to the HMC 1009 by passing the entire south-side ID array 1130 for the adapter 1100, discovered by the hypervisor 1025, to the HMC 1009.

Once the south-side ID array 1130 is presented to the HMC 1009, the system administrator can assign south-side management data contained in the south-side ID array 1130 to virtual guest operating systems. For example, an IP address in the south-side ID array 1130 can be assigned to a virtual Ethernet port of a virtual guest. Once that assignment is initially made, that assignment will be persistent and a delete or modify operation occurs on the virtual Ethernet port owned by the virtual guest.

For example, the HMC 1009 may present the collected information and the south-side management data to the user who is configuring the system and the user may determine how many VFs are to be used and which ones get assigned to which client partitions. The HMC 1009 may present the IOV information from the user to the hypervisor 1025 which may then set the system id.root complex id.RID field (see FIG. 11C) in the south-side array to uniquely identify the VF(s) associated with the south-side management data. The system id.root complex id. RID provide a unique way to identify an entry in the south-side ID array since the RID (requester ID) is assigned per virtual adapter instance (e.g., per VF). The root complex ID identifies the root complex and the system ID identifies the system.

Thus, the administrator, via the mechanisms of the illustrative embodiments, is provided with the necessary information to assign data specific to the purpose of particular devices (e.g., assigning an IP address to a virtual adapter so that the adapter can become part of a TCP/IP network, assigning a WWPN to a Fibre Channel adapter, etc.). This enables the management of low level data shipped with the device (e.g., MAC address, WWPN, etc.) using the south-side ID array and provides access to this data structure by the user interface to the HMC and ultimately the system administrator. The SR-PCIM and MR-PCIM may use the south-side ID array to help in management operations, such as the add, delete, and modify management operations. Moreover, this information in the south-side ID array may be used by the SR-PCIM and MR-PCIM to assist with external protocol specific functions such as error monitoring and error handling.

Figure 11B:
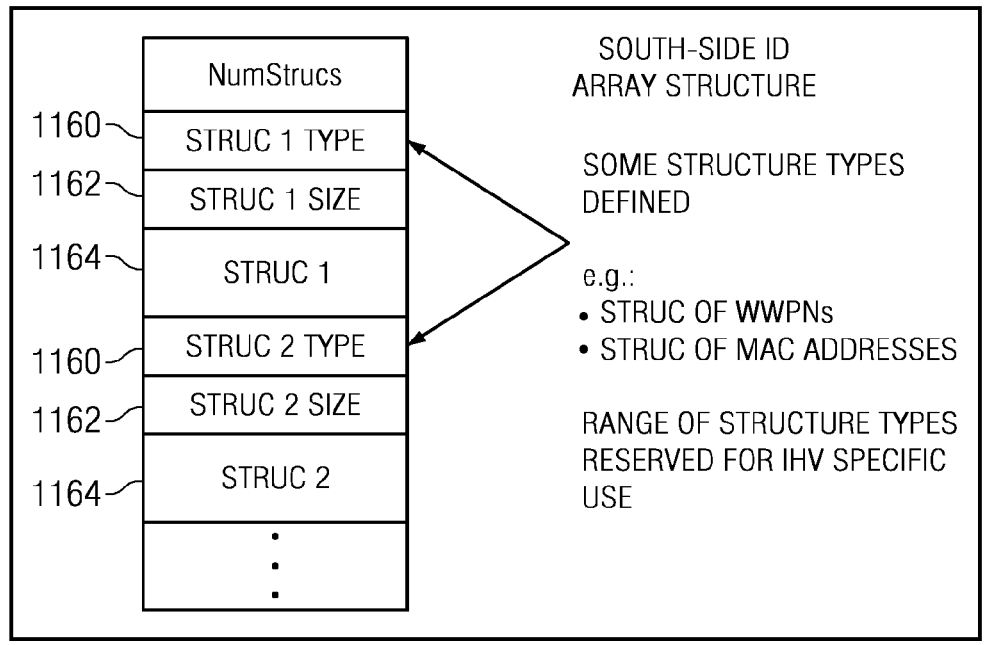
FIG. 11B is an exemplary diagram of a data structure for south-side management functions in a south-side ID array in accordance with one illustrative embodiment.

FIG. 11B is an exemplary diagram illustrating a data structure for south-side management functions in a south-side ID array in accordance with one illustrative embodiment. As shown in FIG. 11B, the data structure comprises a first field 1160 identifying a type of device being discovered by the hypervisor 1025. A size field 1162 is also provided that can be used by the hypervisor 1025 to determine the size of the south-side management table. Each "structure," i.e. Struc 1, Struc 2, etc., is one entry in the south-side ID array. Each entry has at least a type and a size provided in the type field 1160 and the size field 1162. The size field 1162 is used in embodiments in which different types of devices have different sized south-side data, e.g., an IP address has a different length than a WWPN. In other embodiments, a fixed size south-side data may be utilized in which case the size field 1162 would not be necessary, however this will tend to lead to wasted storage space with regard to south-side data that does not fill the entire allotted size for the south-side data.

There is one structure in the south-side ID array for each virtual function (VF) with each south-side ID array being identified by a unique RID. In FIG. 11A, the multiple arrows pointing to the south-side ID array represent pointers to specific entries or structures within the south-side ID array, e.g., structures Struc 1, Struc 2, etc. Given the type field 1160 and the size field 1162 of the various structures, a programmer or program may advance from one structure to the next in the south-side ID array in order to access information about each of the devices whose information is stored in the south-side ID array. The information in the south-side ID array entries or structures may thus be access in order to perform various functions. For example, in one illustrative embodiment, the SR-PCIM, MR-PCIM, hypervisor, or the like, may use a RID to identify an entry or structure in the south-side ID array and thereby access the type of device from the type field 1160. The type of device may be used to properly format the south-side data contained in the structure data field 1164 (Struc 1, Struc 2, etc.) immediately following the size field 1162.

The structure data field 1164 may store any of the south-side data used by the system to manage the various devices, e.g., IP address, WWPN, etc. Thus, the structure data field

1164 stores the actual south-side data. This information may be retrieved from the south-side ID array for management operations by the SR-PCIM, MR-PCIM, hypervisor, or the like, using the RID to access a particular entry within the south-side ID array.

FIG. 11C shows a save/restore south-side management structure intended for usage by a non-volatile area of the HMC 1009 in accordance with one illustrative embodiment. The save/restore south-side management structure shown in FIG. 11C illustrates how the SR-PCIM, MR-PCIM, hypervisor, or the like may have constructed the data from the entry or structure in the south-side ID array in FIG. 11B in a human readable format. This structure is intended for usage by the administrator to populate or simply read the desired south-side data from the south-side ID array shown in FIG. 11B. More precisely, a graphical user interface, such as the HMC's graphical user interface, may provide functionality for a user, such as an administrator, to provide input in a human-friendly way, and then format it into the standard format for placing into the south-side ID array. For simplicity this operation is referred to as the administrator populating the fields of the south-side ID array. Thus, data in this structure may be derived from the south-side ID array of FIG. 11B or populated by the administrator, depending upon the particular field and the agreed upon implementation.

As shown in FIG. 11C, a device field 1170 is provided in the save/restore south-side management structure, in addition to the type field 1160 and structure data fields 1164, for use by the graphical user interface 1042 on the HMC 1009. The type field 1160 is readable by the HMC, hypervisor, or other application software providing the user interface and may have been "burned" into the device/adapter to represent the type of VF this entry in the south-side ID array represents. The HMC, hypervisor, or other software application may examine this type field 1160 to determine the class, or type, of device, for example PCIe Ethernet, and populate the device field 1170 of this structure.

The device field 1170 is a human readable device identifier and is not actually passed to the south-side ID array on the device, e.g., the adapter or virtual device, when the south-side ID array data structure is populated. To the contrary, as mentioned above, the device field 1170 may be interpreted from the type field 1160 that is stored in the south-side ID array, in order to provide a human readable identifier of the device type rather than a non-human readable type designator.

The "device south-side state" or "device SSS" field 1172 stores data that may be burned into the device by the manufacturer of the device and represented in this field 1172 or may be populated in this field 1172 by the administrator if private information is desired. An example of device SSS is a hardware address for Ethernet, such as the MAC address or the Fibre Channel WWPN. The "External South-side" state field 1174 is typically populated by the administrator when a VF is associated with a virtual device in a guest operating system. This field 1174 may typically be populated with higher layer protocol information. For example, in the case of an Ethernet type of device, this field 1174 may be updated by the administrator with an IP address or may be populated with a system generated IP address (e.g., DHCP generated IP address for an Ethernet type of device).

The "system id.root complex id.RID" field 1176 may be populated by the hypervisor, automatically by the HMC, or manually by the administrator, for example. This field 1176 uniquely identifies the VF since the VF is unique for a single root system and the system id.root complex id pair uniquely identifies a system in a multi-root environment.

It should be noted that there are a number of different ways in which the south-side ID array data structure may actually be populated. For example, in one illustrative embodiment, a device vendor may use the south-side ID array data structure as part of an industry standard. Thus, for example, consumers of the device, e.g., the adapter, such as server manufacturers, may find the south-side ID array at a documented address offset pointed to by configuration space and populated with information (e.g., Ethernet MAC addresses) in the south-side ID array that correspond to the VF's supported by the device, e.g., adapter. In another illustrative embodiment, where the south-side ID array may not be part of an industry standard, a device vendor and host system manufacturer may agree on a design for the south-side ID array. In this design agreement the south-side ID array may be populated by the device vendor at a documented address offset pointed to by the configuration space and populated with information (e.g., Ethernet MAC addresses). After the south-side ID array is moved to the HMC and presented to the administrator, the administrator may populate the array with additional information (e.g., IP addresses per VF).

As discussed above, FIG. 11C shows an example of the fields of a south-side ID array entry or structure that the administrator would see, such as via the HMC's graphical user interface. FIG. 11D shows an example south-side ID array representation with some of the fields illustrated as they would be populated by an administrator, such as via the HMC's graphical user interface. It should be noted that the content of fields in FIG. 11D is dependent upon the type of device being represented.

In the event private information is desired or nothing is "burned" into the device, e.g., adapter, then the administrator might populate all of the fields of the array including the MAC address. Today production Ethernet adapters ship with MAC addresses "burned into them" but multiple virtual instance of the device (VFs) are not part of any PCI standard prior to IO Virtualization. Even if the MAC address is burned into today's production adapters, some still allow for that MAC address to be changed in a non-standard way. The mechanisms of the illustrative embodiments allow a standard way to manage the MAC address and other south-side data. Other embodiments for populating the south-side ID array may be utilized without departing from the spirit and scope of the present invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 12:
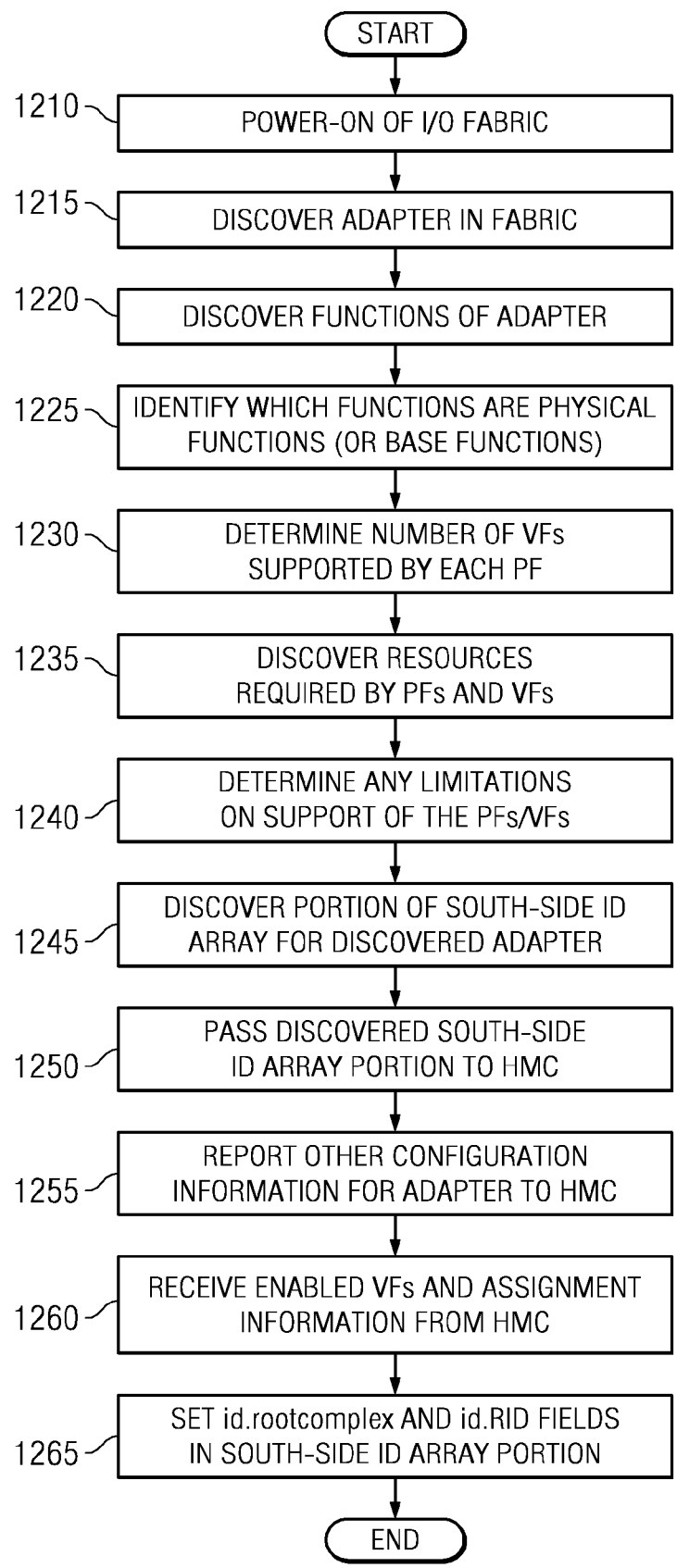
FIG. 12 is a flowchart outlining an exemplary operation of a hypervisor, or other virtualization platform, for south-side function management, in accordance with one illustrative embodiment.

FIG. 12 is a flowchart outlining an exemplary operation of a hypervisor, or other virtualization platform, for south-side function management, in accordance with one illustrative embodiment. The operations outlined in FIG. 12 are for discovery and management of functions for a single adapter. However, it should be appreciated that the same set of operations may be performed with regard to a plurality of adapters and their functions.

As shown in FIG. 12, the operation starts with a power-on of the I/O fabric, e.g., a PCIe fabric (step 1210). The hypervisor discovers the adapter in the fabric below the platform hardware (step 1215). The hypervisor then discovers the functions of the adapter (step 1220). In one illustrative embodiment, this may be done by addressing the configuration space by requester ID (RID) and register number (e.g., bus number, device number, function number, and register number). That is, the bus/dev/func are each sequentially incremented while "probing" to find all the active functions on all adapters.

Having discovered the functions of the adapter, the hypervisor identifies which functions are physical functions (or base functions), by the presence of a SR-IOV extended capability structure in the function's associated configuration space (step 1225). For each identified PF, the hypervisor determines the number of VFs that can be supported by the PF (step 1230).

The hypervisor discovers the resources needed by the PFs and VFs from the PF/VF configuration spaces (step 1235). The type of the device, the number of PFs, and number of VFs, for example, enables the hypervisor to look up the device resource requirements, such as number of registers, memory, and interrupts. The hypervisor may then calculate resource requirements for the given number of interrupts.

The hypervisor determines any limitations on support of the PFs/VFs (step 1240), such as based on the base address register (BAR) space, number of interrupts, DMA window space, or the like. The BARs allow for determination of the amount of memory space needed by the device as well as setting the starting (Base) address. Thus, if the system is short on memory addressable as memory pointed to by the BARs, then this could be a limitation. Limitations on support of the PFs/VFs may be determined, for example, by performing a lookup of the resources needed based on the determined type of device and then calculating the amount of DMA space needed and other resource requirements. These requirements may be compared against information identifying an amount of resources available and a determination of any limitations may be made based on results of the comparison, e.g., a difference indicating that there is not enough available resources for the determined resource requirements is indicative of a limitation on support for PFs/VFs of the device, e.g., adapter.

The hypervisor discovers the portion of the south-side ID array for the south-side management functions of the discovered adapter (step 1245). This may be done, for example, by using the pointers in the configuration space of the PF or BF of the discovered adapter and using those pointers to access the south-side ID array in the MMIO address space, as discussed above, for example. The discovered south-side ID array is passed to the HMC (step 1250). In addition, the hypervisor may report the vendor ID/DeviceID, number of functions, physical functions, and virtual functions supportable by the discovered adapter, and other discovered configuration information to the HMC (step 1255).

The HMC may then either automatically determine, or present the information to a user and receive a user selection of, the VFs to be enabled and their assignment to client partitions. This information may be passed back to the hypervisor which receives the information (step 1260) and sets the system id.rootcomplex and id.RID fields in the south-side ID array to uniquely identify the VF associated with the discovered south-side ID array data (step 1265). The operation then terminates.

Figure 13:
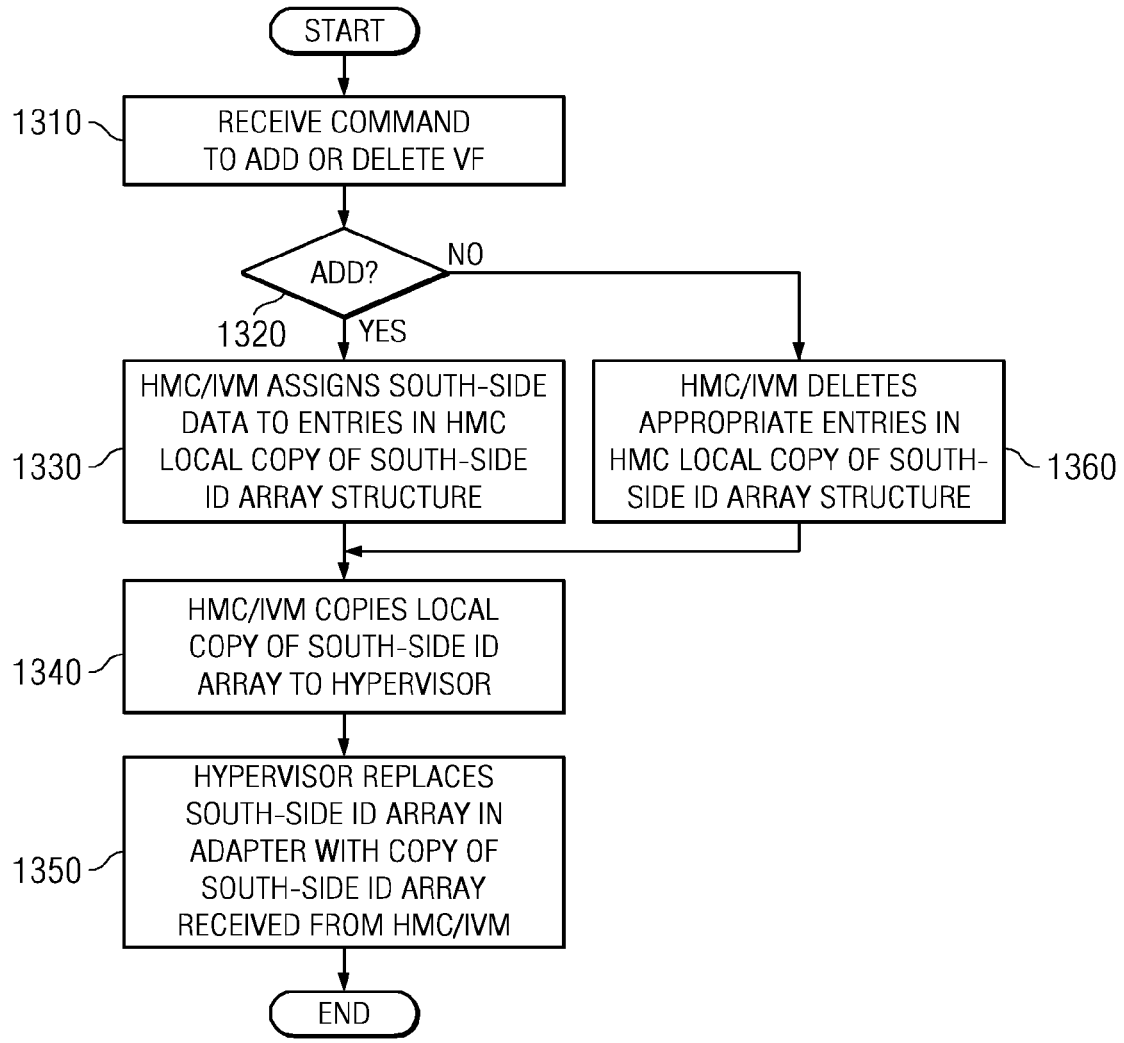
FIG. 13 is a flowchart outlining an exemplary operation of a HMC or I/O virtualization manager, such as a SR-PCIM or MR-PCIM, in accordance with one illustrative embodiment where a hypervisor copies an entire table data structure to the HMC and the HMC populates the entries with south-side data which it then passes to the hypervisor to replace the entire table data structure on the device.

FIG. 13 is a flowchart outlining an exemplary operation of a HMC or I/O virtualization manager (IVM), which communicates with the SR-PCIM or MR-PCIM, in accordance with one illustrative embodiment where a hypervisor copies an entire table data structure to the HMC and the HMC populates the entries with south-side data which it then passes to the hypervisor to replace the entire table data structure on the device. As shown in FIG. 13, the operation starts with the HMC or IVM receiving a command to either add or delete a virtual function from an adapter (step 1310). A determination is made as to whether the command is for adding a virtual function to the adapter (step 1320). If the command is to add a virtual function, the HMC or IVM assigns the south-side data (e.g., IP address, MAC address, WWPN, etc.) to an appropriate entry in the south-side ID array structure in the HMC database, i.e. the south-side ID array that was copied from the adapter by the hypervisor and provided to the HMC (step 1330). The administrator, for example, may select an IP address, such as from a pull-down free list of IP addresses, and store it in the device SSS field (see FIG. 11D), or the IP address may be automatically generated (e.g., using a DHCP server) and stored in the device SSS field.

The HMC or IVM may then copy its entire local copy of the south-side ID array structure to the hypervisor (step 1340) so that the hypervisor can replace the full south-side ID array in the adapter's configuration space for the appropriate physical function (step 1350). If the command is to delete a virtual function from the adapter (step 1320), the HMC or IVM may delete the south-side data in the appropriate entries of its local copy of the south-side ID array structure corresponding to the appropriate system id.rootcomplex id.RID (step 1360). The IP address in the device SSS field (see FIG. 11D), for example, may be returned to a free list of IP addresses. The operation then continues to step 1340 where the local copy of the south-side ID array structure is copied to the hypervisor so that the hypervisor can replace the full south-side ID array in the adapter's configuration space for the appropriate physical function. The operation then terminates.

Figure 14:
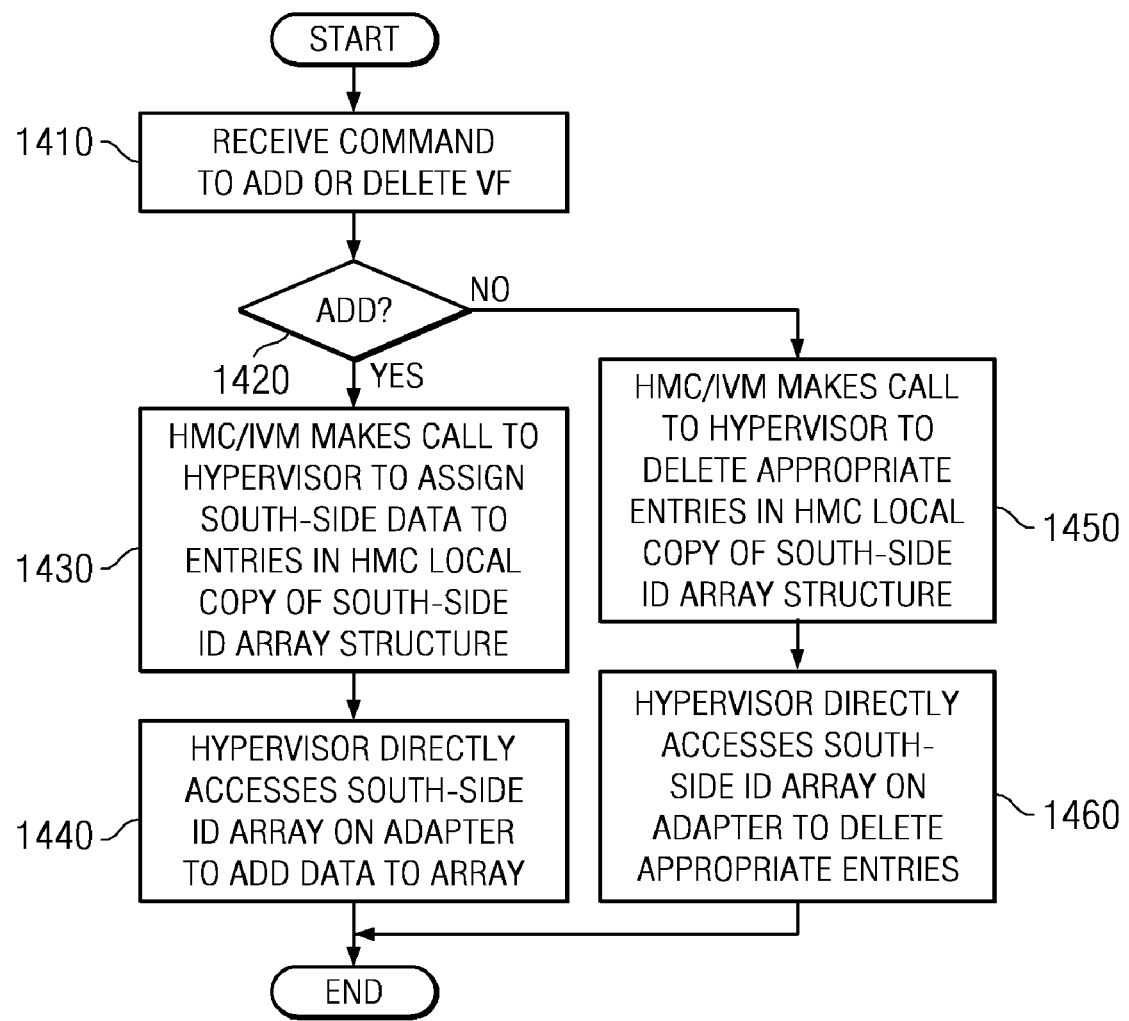
FIG. 14 is a flowchart outlining an exemplary operation of a HMC or I/O virtualization manager, such as a SR-PCIM or MR-PCIM, in accordance with one illustrative embodiment where the HMC may instruct the hypervisor to fill-in the table data structure an entry at a time with the south-side data.

FIG. 14 is a flowchart outlining an exemplary operation of a HMC or I/O virtualization manager, which communicates with the SR-PCIM or MR-PCIM, in accordance with one illustrative embodiment where the HMC may instruct the hypervisor or SR-PCIM or MR-PCIM to fill-in the table data structure an entry at a time with the south-side data. As shown in FIG. 14, the operation starts with the HMC or IVM receiving a command to either add or delete a virtual function from an adapter (step 1410). A determination is made as to whether the command is for adding a virtual function to the adapter (step 1420). If the command is to add a virtual function, the HMC or IVM makes a call to the hypervisor requesting that the hypervisor assign the south-side data (e.g., IP address, MAC address, WWPN, etc.) to one or more fields, e.g., the device SSS field, of an appropriate entry in the south-side ID array structure in the adapter (step 1430). The hypervisor may then directly access the entire south-side ID array and write the south-side management data directly to the array (step 1440).

If the command is to delete a virtual function from the adapter (step 1420), the HMC or IVM may make a call to the hypervisor requesting that the hypervisor delete the south-side data in the appropriate entries of the south-side ID array in the adapter corresponding to the appropriate system id.rootcomplex and id.RID (step 1450). The hypervisor may then directly access the south-side ID array on the adapter to delete the appropriate entries (step 1460). The operation then terminates.

Figure 15:
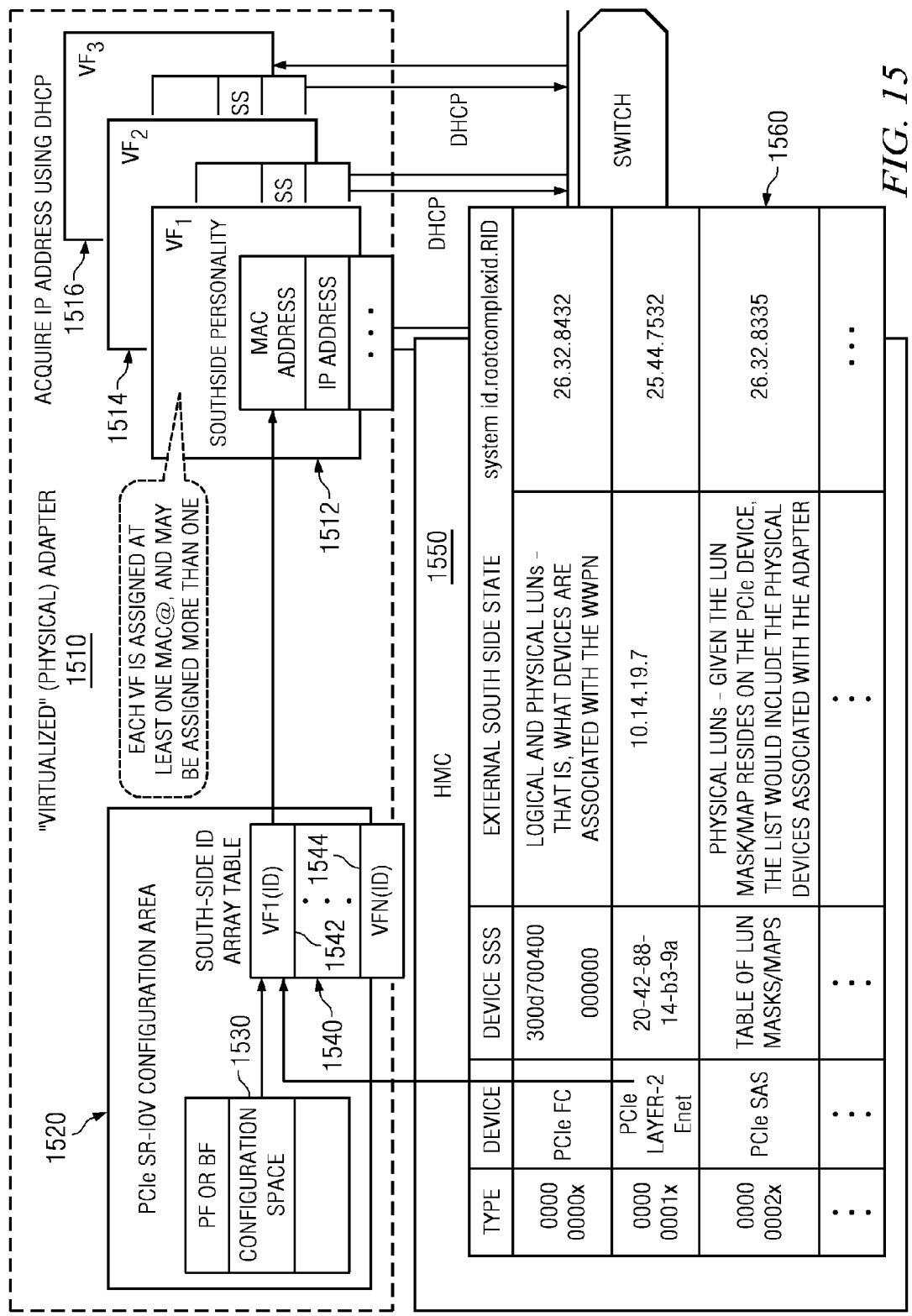
FIG. 15 is an exemplary diagram illustrating the use of table data structures for Ethernet devices in accordance with one illustrative embodiment.

FIGS. 12-14 above outline the various operations of the HMC, SR-PCIM, or MR-PCIM with regard to managing the setup of south-side ID array data with regard to one or more illustrative embodiments. FIG. 15 shows an example of how the usage of the south-side ID array data is managed in an Ethernet environment in accordance with one illustrative embodiment. As shown in FIG. 15, a virtualized adapter 1510 may support a plurality of virtual functions (VFs) 1512-1516 each of which may have their own MAC address. Each VF may further have its own IP address which, in the depicted example, is acquired from a DHCP server, although it is also possible for an administrator to assign IP addresses to the VFs from an IP address pool, as previously discussed above.

As further shown in FIG. 15, the virtualized adapter 1510 further stores a PCIe SR-IOV configuration area 1520 in which a configuration space 1530 is provided along with the south-side ID array data structure 1540. The configuration space 1530 includes pointers to entries or structures 1542-1544 in the south-side ID array data structure 1540 for the various VFs 1512-1516. The entries or structures include the device type, south-side data size, etc., as previously described above. This information may be utilized by the HMC 1550 to present south-side management data to a user, such as an administrator, via a graphical user interface 1560, for example, associated with the HMC 1550. Thus, for the example, the south-side ID array data structure 1540 stores information which, through the graphical user interface 1560, allows the HMC 1550 to display the MAC address, e.g., 20-42-88-14-b3-9a, and the IP address, e.g., 10.14.19.7, of a particular virtual function (VF) or device. This information may be modified by the administrator or even entered initially by the administrator via the user interface 1560. This south-side management data may be stored in the south-side ID array data structure 1540 but may also be stored in an HMC resident database (not shown) which is updated in response to changes made to the south-side ID array data structure 1540.

It should be noted that if the system is restarted, the HMC database containing the south-side data is persistent. Thus, the HMC database may be used to repopulate the south-side data in the south-side ID array data structure 1540 of the virtualized adapter 1510. Moreover, if the host image is migrated to another processor, for example in a multi-root environment, the south-side data associated with the VF that is being migrated may be used to populate the destination VF's south-side ID array entry. As shown in FIG. 15, the south-side state is part of the image, in device SSS and external SSS fields, that may be migrated and restored.

Thus, the illustrative embodiments provide mechanisms for populating a south-side ID array data structure with south-side data for management of virtualized devices and their various virtual functions. The mechanisms of the illustrative embodiments provide a standardized approach to management of such information such that it is accessible by the SR-PCIM, MR-PCIM, hypervisor, and the like, for such management purposes. This standardization allows device vendors and host system providers to make use of the south-side ID array data structure for management operations in an expected manner. Moreover, the mechanisms of the illustrative embodiments allow system administrators to access south-side data for use in managing the various devices and virtual functions of the system.

It should be appreciated that the illustrative embodiments may take the form of a specialized hardware embodiment, a software embodiment that is executed on a computer system having general processing hardware, or an embodiment containing both specialized hardware and software elements that are executed on a computer system having general processing hardware. In one exemplary embodiment, the mechanisms of the illustrative embodiments are implemented in a software product, which may include but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, or semiconductor system, apparatus, or device. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read-only memory (CD-ROM), compact disk-read/write (CD-R/W) and DVD.

The program code of the computer program product may comprise instructions that are stored in a computer readable storage medium in a client or server data processing system. In a client data processing system embodiment, the instructions may have been downloaded over a network from one or more remote data processing systems, such as a server data processing system, a client data processing system, or a plurality of client data processing systems using a peer-to-peer communication methodology. In a server data processing system embodiment, the instructions may be configured for download, or actually downloaded, over a network to a remote data processing system, e.g., a client data processing system, for use in a computer readable storage medium with the remote data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for managing at least one virtual function, associated with a physical function, of an adapter associated with the data processing system, comprising:

receiving a command to modify south-side management data in a south-side management data array associated with the adapter, wherein the command is a command to modify a configuration of the adapter with regard to at least one virtual function of the adapter that is associated with a physical function of the adapter;

retrieving the south-side management data array associated with the adapter from the adapter;

modifying at least a portion of the south-side management data in the south-side management data array on the adapter based on the received command; and managing the at least one virtual function, associated with the physical function, of the adapter based on the south-side management data in the south-side management data array.

2. The method of claim 1, wherein the south-side management data array is created by firmware of the data processing system and is stored in a memory mapped input/output (MMIO) memory of the adapter.

3. The method of claim 2, wherein the adapter further comprises a configuration space memory, and wherein the configuration space memory comprises at least one pointer to the south-side management data array.

4. The method of claim 1, wherein managing the functions of the adapter based on the south-side management data comprises accessing the south-side management data from the south-side management data array based on the at least one pointer to the south-side management data array in the configuration space memory of the adapter.

5. The method of claim 4, wherein a hypervisor of the data processing system performs the management of the functions of the adapter based on the south-side management data.

6. The method of claim 1, wherein retrieving the south-side management data array associated with the adapter from the adapter comprises copying the entire south-side management data array to a hardware management console (HMC), and wherein modifying at least a portion of the south-side management data array on the adapter comprises presenting the south-side management data in the south-side management data array to a user via a user interface of the HMC and receiving user input to the user interface based on the presentation of the south-side management data.

7. The method of claim 6, wherein the south-side management data includes at least one of a device type, a device south-side state, an external south-side state, or a system identifier root complex identifier.

8. The method of claim 1, wherein retrieving the south-side management data array comprises performing a call to a hypervisor to access the south-side management data in the south-side management data array, and wherein modifying at least a portion of the south-side management data comprises directly modifying, by the hypervisor, the south-side management data in the south-side management data array on the adapter in response to receiving the call.

9. The method of claim 1, wherein the command is a command to add a virtual function to the adapter, and wherein modifying at least a portion of the south-side management data comprises adding an entry to the south-side management data array having south-side management data for the virtual function to be added.

10. The method of claim 1, wherein the command is a command to delete a virtual function from the adapter, and wherein modifying at least a portion of the south-side management data comprises deleting an entry from the south-side management data array corresponding to the virtual function to be deleted.

11. A computer program product comprising a computer useable storage medium having a computer readable program stored thereon, wherein the computer readable program, when executed on a computing device, causes the computing device to:
   receive a command to modify south-side management data in a south-side management data array associated with an adapter coupled to the computing device, wherein the command is a command to modify a configuration of the adapter with regard to at least one virtual function of the adapter that is associated with a physical function of the adapter;
   retrieve the south-side management data array associated with the adapter from the adapter;
   modify at least a portion of the south-side management data in the south-side management data array on the adapter based on the received command; and
   manage the at least one virtual function, associated with the physical function, of the adapter based on the south-side management data in the south-side management data array.

12. The computer program product of claim 11, wherein the south-side management data array is created by firmware of the data processing system and is stored in a memory mapped input/output (MMIO) memory of the adapter.

13. The computer program product of claim 12, wherein the adapter further comprises a configuration space memory, and wherein the configuration space memory comprises at least one pointer to the south-side management data array.

14. The computer program product of claim 11, wherein the computing device manages the functions of the adapter based on the south-side management data by accessing the south-side management data from the south-side management data array based on the at least one pointer to the south-side management data array in the configuration space memory of the adapter.

15. The computer program product of claim 14, wherein a hypervisor of the computing device performs the managing of the functions of the adapter based on the south-side management data.

16. The computer program product of claim 11, wherein the computing device retrieves the south-side management data array associated with the adapter from the adapter by copying the entire south-side management data array to a hardware management console (HMC), and wherein the computing device modifies at least a portion of the south-side management data array on the adapter by presenting the south-side management data in the south-side management data array to a user via a user interface of the HMC and receiving user input to the user interface based on the presentation of the south-side management data.

17. The computer program product of claim 11, wherein the computing device retrieves the south-side management data array by performing a call to a hypervisor to access the south-side management data in the south-side management data array, and wherein the computing device modifies at least a portion of the south-side management data by directly modifying, by the hypervisor, the south-side management data in the south-side management data array on the adapter in response to receiving the call.

18. The computer program product of claim 11, wherein the command is a command to add a virtual function to the adapter, and wherein the computing device modifies at least a portion of the south-side management data by adding an entry to the south-side management data array having south-side management data for the virtual function to be added.

19. The computer program product of claim 11, wherein the command is a command to delete a virtual function from the adapter, and wherein the computing device modifies at least a portion of the south-side management data by deleting an entry from the south-side management data array corresponding to the virtual function to be deleted.

20. A system, comprising:
   a host system; and
   an adapter coupled to the host system, wherein the host system:
   receives a command to modify south-side management data in a south-side management data array associated with the adapter, wherein the command is a command to modify a configuration of the adapter with regard to at least one virtual function of the adapter that is associated with a physical function of the adapter;
   retrieves the south-side management data array associated with the adapter from the adapter;
   modifies at least a portion of the south-side management data in the south-side management data array on the adapter based on the received command; and
   manages the at least one virtual function, associated with the physical function, of the adapter based on the south-side management data in the south-side management data array.

* * * * *